(12) United States Patent
Demiryont

(10) Patent No.: US 12,066,734 B1
(45) Date of Patent: *Aug. 20, 2024

(54) ELECTROCHROMIC DEVICE HAVING VARIOUS USES

(71) Applicant: Eclipse Energy Systems, Inc., St. Petersburg, FL (US)

(72) Inventor: Hulya Demiryont, St. Petersburg, FL (US)

(73) Assignee: ECLIPSE ENERGY SYSTEMS, INC., St. Petersburg, FL (US)

( * ) Notice: Subject to any disclaimer, the term of this patent is extended or adjusted under 35 U.S.C. 154(b) by 698 days.

This patent is subject to a terminal disclaimer.

(21) Appl. No.: 17/240,005

(22) Filed: Apr. 26, 2021

Related U.S. Application Data

(63) Continuation-in-part of application No. 16/677,215, filed on Nov. 7, 2019, now Pat. No. 10,996,535.

(60) Provisional application No. 62/756,817, filed on Nov. 7, 2018.

(51) Int. Cl.
| | |
|---|---|
| *G02F 1/157* | (2006.01) |
| *E06B 9/24* | (2006.01) |
| *G02C 7/10* | (2006.01) |
| *G02F 1/1523* | (2019.01) |
| *G02F 1/155* | (2006.01) |
| *H02S 40/22* | (2014.01) |

(52) U.S. Cl.
CPC ............... *G02F 1/157* (2013.01); *E06B 9/24* (2013.01); *G02C 7/101* (2013.01); *G02F 1/1525* (2013.01); *G02F 1/155* (2013.01); *H02S 40/22* (2014.12); *E06B 2009/2464* (2013.01); *G02F 2001/1555* (2013.01)

(58) Field of Classification Search
CPC ........ G02F 1/157; G02F 1/1525; G02F 1/155; G02F 2001/1555; E06B 9/24; E06B 2009/2464; G02C 7/101; H02S 40/22
USPC .................................. 359/265–275; 345/105
See application file for complete search history.

(56) References Cited

U.S. PATENT DOCUMENTS

| | | | |
|---|---|---|---|
| 4,923,289 A | 5/1990 | Demiryont | |
| 5,138,481 A | 8/1992 | Demiryont | |
| 5,253,101 A | 10/1993 | Demiryont | |
| 5,377,037 A * | 12/1994 | Branz | ............... G02C 7/101 |
| | | | 359/267 |
| 5,724,177 A | 3/1998 | Ellis, Jr. et al. | |

(Continued)

*Primary Examiner* — Tuyen Tra
(74) *Attorney, Agent, or Firm* — Shumaker, Loop & Kendrick, LLP

(57) ABSTRACT

Electrochromic devices having buffer layer(s) that promote electron transfer between the second transparent electrode and second electrochromic layer while concurrently reducing or inhibiting deleterious chemical interaction between the second electrochromic layer and the second electrode and/or maintaining the conductive state of the second electrode and while the device changes the from a low transparency state of approximately 10-20% transmittance in the visible region to a high transparency state of approximately 75% to 95% transmittance in the visible region with at least a 70% difference in transmittance between the low and high transmittance states. In certain aspects, the electrochromic devices change from a low transparency state having a gray color to a high transparency state that is substantially colorless within 20 seconds of applying the selective electrical potential to the electrochromic device.

33 Claims, 22 Drawing Sheets

(56) References Cited

U.S. PATENT DOCUMENTS

| | | | |
|---|---|---|---|
| 6,094,292 | A | 7/2000 | Goldner et al. |
| 6,791,737 | B2 | 9/2004 | Giron |
| 6,816,297 | B1 * | 11/2004 | Tonar .................. G02B 1/14 |
| | | | 359/507 |
| 6,822,778 | B2 | 11/2004 | Westfall et al. |
| 7,265,891 | B1 | 9/2007 | Demiryont |
| 7,372,610 | B2 | 5/2008 | Burdis et al. |
| 7,428,090 | B2 | 9/2008 | Fukazawa et al. |
| 7,564,611 | B2 | 7/2009 | Jang et al. |
| 7,704,555 | B2 | 4/2010 | Demiryont |
| 8,300,298 | B2 | 10/2012 | Wang et al. |
| 8,773,746 | B2 | 7/2014 | Tajima et al. |
| 9,013,778 | B2 | 4/2015 | Burdis et al. |
| 10,656,492 | B2 | 5/2020 | Martin et al. |
| 2017/0075143 | A1 * | 3/2017 | Saylor .................. G02C 7/101 |
| 2018/0136530 | A1 * | 5/2018 | Yamamoto ............ G02F 1/163 |

* cited by examiner

Transmission vs. Oxidation Level Of $NiO_x$

ELECTROCHROMIC DEVICE HAVING VARIOUS USES

TECHNICAL FIELD

The invention relates to device(s) for varying light transmission, and more particularly, to electrochromic device(s) having buffer layer(s) that provide for improved electrochromic device performance, conductivity, color switching, and lifespan when compared to conventional electrochromic devices. Moreover, these devices may be used to block and/or reflect certain predetermined wavelengths of laser light to provide a laser protective surface. Moreover, these devices may be applied to mirrors for various purposes such as dimming solar glare and/or active dark mirror applications (e.g., automobile mirrors). Moreover, the electrochromic devices disclosed herein may be applied to transparent substrates (e.g., glass or polymeric substrates) and act as filter in part of the electromagnetic spectrum to selectively transmit and/or block and/or reflect predetermined wavelengths in optical glassware/eyewear (e.g., sunglasses, goggles, reading glasses and/or prescription glasses), a window, and/or a dynamic window system. Moreover, the electrochromic devices disclosed herein may be combined and/or operably coupled with a photovoltaic device in which one electrode of electrochromic device can be used as electron connector of the photovoltaic device and the photovoltaic device provides energy to activate the electrochromic device.

BACKGROUND

Conventional electrochromic devices change light transmission and/or light reflection upon the application of an external DC voltage. Typically, electrochromic devices include two active layers (or electrochromic layers) that are separated by an electrolyte layer. Electrodes are in electrical contact with each of the two active layers. One active layer of the electrochromic device is referred to an as ion storage layer that stores charge carriers in the form of mobile ions and associated electrons while the other active layer is referred to as an acceptor layer that accepts ions donated from the ion storage layer through the electrolyte and associated electrons transfer from one electrode to the other through external circuit.

Upon the application of a DC voltage between the electrodes, a charge is transferred between one of the active layers through the electrolyte to the other of the active layers and associated electrons through an external circuit, to change the light transmission and/or light reflection of one or both of the active layers.

Over the past several decades, many advances have been made in the art, and the below mentioned references are representative of the progress made during this time period.

U.S. Pat. No. 4,923,289 to Demiryont discloses electrochromic devices having a color intensity gradient. Specifically the electrochromic device comprises two substrates and there between: one electrode layer; an electrochromic layer; an ion conductive material; and another electrode layer in that order. At least one of the electrode layers is transparent and each electrode layer is in contact with a respective one of the substrates. The ion conductive layer is adapted to communicate ions to and from the electrochromic material upon the application of a voltage across the electrode layers. The electrochromic material has a continuously decreasing thickness gradient in at least one region when measured normal to the plane of an electrode layer.

U.S. Pat. No. 5,138,481 to Demiryont discloses a method of gradationally infusing a graded thickness permeable medium with a uniform concentration of a material. A method of gradationally infusing a uniform thickness permeable medium with a gradational concentration of material is also disclosed. The method includes placing the material in a container, and inserting and removing the permeable medium in the container so that the permeable medium includes either a gradational or uniform concentration of the material therein dependent upon the thickness of the medium. The method disclosed also allows uniform thickness or graded thickness electrochromic materials to be gradationally infused with an ion source to provide a color gradient within an electrochromic device. An electrochromic device made according to this method is also disclosed.

U.S. Pat. No. 5,253,101 to Demiryont discloses a reduced tungsten oxide electrochromic material, useful in an electrochromic device, having excellent electrochromic properties. The oxidation number of the tungsten of the material as deposited on a support of the device in a stable bleached condition is, on average, between +5.99 and +5.90. The material may be made by reducing fully oxidized tungsten oxide by a reducing agent. The reducing agent may be a metal or a metal oxide.

U.S. Pat. No. 5,724,177 to Frank B. Ellis, Jr. et al. discloses electrochromic devices which may be used for large surface area applications. These devices utilize optical tuning to minimize optical interference between layers of the structure and to maximize uniform optical transparency. Optical tuning also enables transparent conductive oxide layers to be replaced by thin conductive metal layers thereby reducing the overall thickness of these devices and facilitating the manufacturing process.

U.S. Pat. No. 6,094,292 to Goldner, et al. discloses a multi-layered, active, thin film, solid-state electrochromic device having a high reflectivity in the near infrared in a colored state, a high reflectivity and transmissivity modulation when switching between colored and bleached states, a low absorptivity in the near infrared, and fast switching times, and methods for its manufacture and switching. In one embodiment, a multi-layered device comprising a first indium tin oxide transparent electronic conductor, a transparent ion blocking layer, a tungsten oxide electrochromic anode, a lithium ion conducting-electrically resistive electrolyte, a complimentary lithium mixed metal oxide electrochromic cathode, a transparent ohmic contact layer, a second indium oxide transparent electronic conductor, and a silicon nitride encapsulant is provided. Through elimination of optional intermediate layers, simplified device designs are provided as alternative embodiments. Typical colored-state reflectivity of the multi-layered device is greater than 50% in the near infrared, bleached-state reflectivity is less than 40% in the visible, bleached-state transmissivity is greater than 60% in the near infrared and greater than 40% in the visible, and spectral absorbance is less than 50% in the range from 0.65-2.5 µm.

U.S. Pat. No. 6,791,737 to J. C. Giron discloses an electrochemical device comprising at least one substrate, at least one electroconductive layer at least one electrochemically active layer capable of reversibly injecting ions, and an electrolyte, wherein the electrolyte is a layer or a multilayer stack comprising at least one layer made of an ionically conductive material capable of reversibly injecting the ions but whose overall degree of oxidation is maintained essentially constant.

U.S. Pat. No. 6,822,778 to Westfall et al discloses an improved electrochromic device comprising a substrate and a first conductive layer located on the transparent substrate. An ion storage layer is located on the first conductive layer. An electrolyte layer is located on the ion storage layer with an active layer being located on the electrolyte layer. A second conductive layer is located on the active layer.

U.S. Pat. No. 7,265,891 to Demiryont discloses an electrochromic device prepared by forming multiple layers of selected materials on a substrate in a vacuum processing chamber. A first of these layers is an electrode layer deposited directly on the substrate and used for making contact to a subsequently deposited precursor film, preferably tungsten oxide, from which an electrochromic layer is formed by lithium loading in the presence of ionized nitrogen. This not only forms the electrochromic layer by diffusion of the lithium into the tungsten oxide, but also forms a thin lithium nitride ion transfer layer on the then exposed surface. Subsequently, a lithium fluoro-nitride electrolyte layer is formed on the ion transfer layer by evaporation from a lithium fluoride source in the presence of ionized nitrogen. An ion storage layer, which may be a vanadium oxide and a transparent second electrode layer are subsequently vacuum deposited.

U.S. Pat. No. 7,372,610 to Burdis, et al. discloses a heat treated electrochromic device comprising an anodic complementary counter electrode layer comprised of a mixed tungsten-nickel oxide and lithium, which provides a high transmission in the fully intercalated state and which is capable of long term stability. Methods of making an electrochromic device comprising an anodic complementary counter electrode comprised of a mixed tungsten-nickel oxide are also disclosed.

U.S. Pat. No. 7,428,090 to Fukazawa discloses the suppression of deterioration of characteristics due to repeated cycles of coloration and discoloration in an electrochromic element comprising an oxidative coloration layer composed of a nickel oxide and a electrolyte composed of a solid electrolyte.

U.S. Pat. No. 7,564,611 to Jang, et al. disclose a method for preparing an electrode containing lithium nickel oxide wherein nickel has a single oxidation number. The method comprises the following steps: a) preparing an electrode containing the lithium nickel oxide ($Li_xNi_{1-y}O$, $0.4<x<1$, $0<y<1$) layer formed on the conductive substrate; and b) applying oxidative voltage to the electrode, and then applying reductive voltage thereto, an electrode prepared by the method and an electrochromic device containing the same. The electrode containing the lithium nickel oxide layer of the present invention exhibits wider optical electrochromic range and fast reaction speed, so that it can contribute to improving electrochromism and other optical properties of an electrochromic device.

U.S. Pat. No. 7,704,555 to Demiryont, discloses a method of preparing an electrochromic device involving forming multiple layers of selected materials on a substrate in a vacuum processing chamber. A first of these layers is an electrode layer deposited directly on the substrate and used for making contact to a subsequently deposited precursor film, preferably tungsten oxide, from which an electrochromic layer is formed by lithium loading in the presence of ionized nitrogen. This not only forms the electro chromic layer by diffusion of the lithium into the tungsten oxide, but also forms a thin lithium nitride ion transfer layer on the then exposed surface. Subsequently, a lithium fluoro-nitride electrolyte layer is formed on the ion transfer layer by evaporation from a lithium fluoride source in the presence of ionized nitrogen. An ion storage layer, which may be a vanadium oxide and a transparent second electrode layer are subsequently vacuum deposited.

U.S. Pat. No. 8,300,298 to Wang, et al. discloses that conventional electrochromic devices frequently suffer from poor reliability and poor performance. Improvements are made using entirely solid and inorganic materials. Electrochromic devices are fabricated by forming an ion conducting electronically insulating interfacial region that serves as an IC layer. In some methods, the interfacial region is formed after formation of an electrochromic and a counter electrode layer. The interfacial region contains an ion conducting electronically insulating material along with components of the electrochromic and/or the counter electrode layer. Materials and microstructure of the electrochromic devices provide improvements in performance and reliability over conventional devices.

Technical Paper "Improved electrochemical performance of NiO based thin films by lithium addition: from single layers to devices", Hakim Moulki, et al.; Electrochimica Acta, July 2013 (46-52).

Technical Paper "Electrochemical Lithium Nickel Oxide Thin Films by RF-Sputtering from $LiNiO_2$ Target" F. Michalak, et al.; Third International Meeting on Electrochronics in London, England, Sep. 8, 1998 and accepted for publication in Electrochimica Acta.

Technical Paper "Solvent-Free Process to Fabricate High Contrast Electrochromic Device Based on Tungsten Oxide and Nickel Oxide"; Hyungsub Kim, et al.; IME-12, Delft, Netherlands 2016.

Although great improvements have been made in the field of electrochromic device(s) over the past few decades, there remains a need to improve the differential between the high light transmission state (commonly referred to as a "bleached state") and a low light transmission state (commonly referred to as a "colored state") and the speed at which the change between states occur, which concurrently maintaining optimal conductivity of the device.

SUMMARY

Accordingly, disclosed herein are electrochromic devices that provide improved differentials between the high light transmission state (commonly referred to as a "bleached state") and a low light transmission state (commonly referred to as a "colored state"), and increased speed at which the electrochromic devices changes between the high light transmission and low light transmission states when compared to conventional electrochromic devices. The disclosed electrochromic devices further have longer lifespans when compared to conventional electrochromic devices due to the advantageous configurations, and more specifically due to the buffer layers, disclosed herein.

Disclosed are electrochromic stacks and device(s) having the advantages mentioned above in view of conventional electrochromic devices. Specifically disclosed is an electrochromic device including: (i) a first transparent electrode comprising a conductive metal oxide and is configured to selectively gain and/or lose electrons upon selective application of electrical potential to the electrochromic device; (ii) a first electrochromic layer formed on and in electrical contact with the first transparent electrode, the first electrochromic layer is configured to reversibly change from a colored state to a transparent state upon loss of a first amount of ions and electrons from the first electrochromic layer upon selective application of electrical potential to the electrochromic device; (iii) an electrolyte layer formed on the first electrochromic layer and positioned between the first electrochromic layer and a second electrochromic layer, the electrolyte layer is configured to selectively transfer ions from the first electrochromic layer to the second electrochromic layer upon selective application of electrical potential between the first electrode and a second transparent electrode to change the electrochromic device from a low transparency state of approximately 10-20% transmittance in the visible region to a high transparency state of approximately 75% to 95% transmittance in the visible region with at least a 70% difference in transmittance between the low and high transmittance states; (iv) the second electrochromic layer formed on the electrolyte layer, the second electrochromic layer comprises an electrochromic metal oxide and is configured to reversibly change from a colored state to a transparent state upon gaining an amount of ion-electron pairs that coincides with the loss of the first amount of ion-electron pair from the first electrochromic layer upon selective application of electrical potential to the electrochromic device; (v) a buffer layer formed on the second electrochromic layer and positioned between the second electrochromic layer and the second transparent electrode that is configured to maintain conductivity and stability of the electrochromic device while in use; and (vi) the second transparent electrode formed on the buffer layer and in electrical contact with the second electrochromic layer, the second transparent electrode comprises the same conductive metal oxide as the first transparent electrode and is configured to selectively gain and/or lose electrons upon application of selective electrical potential to the electrochromic device, wherein: the buffer layer promotes electron transfer between the second transparent electrode and second electrochromic layer while concurrently reducing or inhibiting deleterious chemical interaction between the second electrochromic layer and the second electrode and/or maintaining the conductive state of the second electrode while the electrochromic device changes from the low transparency state to the high transparency state.

In certain aspects, the electrochromic device is configured to change from the low transparency state having a gray color to the high transparency state that is substantially colorless (and/or vice versa) within 30 seconds, 25 seconds, 20 seconds, 15 seconds, 10 seconds, or 5 seconds of applying the selective electrical potential to the electrochromic device.

In certain aspects, the buffer layer is configured to react with and sequester excess oxygen from the second electrochromic layer thereby limiting and/or inhibiting interaction of excess oxygen from the second electrochromic layer with the second electrode to maintain a conductive state of the second electrode while the electrochromic device changes from the low transparency state to the high transparency state during application of selective electrical potential to the electrochromic device.

In certain aspects, the buffer layer comprises at least one of: a $NiO_{x1}$ layer configured to transfer electrons between the second electrode and second electrochromic layer, a metallic nickel (Ni) layer configured to react with and sequester excess oxygen from the second electrochromic layer to maintain a conductive state of the second electrode while the electrochromic device changes from the low transparency state to the high transparency state, and/or an oxygen deficient $ITO_X$ layer configured to react with and sequester excess oxygen from the second electrochromic layer to maintain a conductive state of the second electrode while the electrochromic device changes from the low transparency state to the high transparency state.

In certain aspects, the buffer layer is an $NiO_{x1}$ layer where $x_1$ is $1.4 < x_1 < 1.45$ and the second electrochromic layer is NiOx where x is $1.0 < x < 1.45$.

In certain aspects, the second electrochromic layer comprises nickel oxide (NiOx) in which x of NiOx is $1.3 < x < 1.5$ and the buffer layer comprises one of a metallic nickel (Ni) layer configured to react with and sequester excess oxygen from the second electrochromic layer to maintain a conductive state of the second electrode while the electrochromic device changes from the low transparency state to the high transparency state or an oxygen deficient ITOx layer configured to react with and sequester excess oxygen from the second electrochromic layer to maintain a conductive state of the second electrode while the electrochromic device changes from the low transparency state to the high transparency state.

In certain aspects, the first and the second transparent electrodes each comprise a transparent conductive oxide (TCO).

In certain aspects, the first and the second transparent electrodes are each selected from the group consisting of ITO, $SnO_2F$, ZAO (Al doped ZnO) fluorine doped tin, fluorine doped ZnO.

In certain aspects, the first and the second transparent electrodes each comprise a indium tin oxide (ITO) layer.

In certain aspects, first electrochromic layer is a lithium tungsten oxide ($Li_xWO_3$) layer in which x<0.2. In preferred aspects, x should remain less than 0.2 in order to limit and/or prevent intercalation of Li ions into the first transparent electrode (e.g., ITO1) thereby preventing the electrochromic device from becoming resistive and maintaining operability of the electrochromic device.

In certain aspects, the electrolyte layer is comprised of lithium fluoro nitride layer ($LiF_XN_Y$), and the ions are lithium (Li) ions. More preferably, the electrolyte layer is a lithium fluoro nitride layer ($LiF_XN_Y$) and the electrochromic device further includes an LiNx ion transfer layer positioned between the first electrochromic layer and the electrolyte that facilitates lithium ion transport between the electrolyte and first electrochromic layers upon application of selective electrical potential to the electrochromic device.

In certain aspects, lithium (Li) ions intercalate and de-intercalate between the first and the second electrochromic layers upon the application of a reverse electrical potential to facilitate the electrochromic device changing from the low transparency state at 1.6V with the first transparent electrode having a negative polarity to the high transparency state at 0.6V with the first transparent electrode having a positive polarity and vice versa upon reversing polarity.

In certain aspects, the second electrochromic layer comprises a nickel oxide (NiOx) wherein x of NiOx is $1.3 < x < 1.5$.

In certain aspects, the electrochromic device further includes a substrate either a transparent substrate or a reflective substrate (e.g., a mirror) having either the first or the second electrode is formed thereon.

In certain aspects, the transparent substrate or the mirror is either planar or curved and is formed of either glass or polycarbonate. When curved, the transparent substrate or the mirror can have a concave or convex shape. In addition, when the transparent substrate or the mirror is polycarbonate, the polycarbonate may be further surface treating with, for example, an adhesion enhancing coating (comprised of Si and/or $SiO_2$) to increase adhesion between the substrate and electrode that is deposited thereon.

In certain aspects, the sealant is deposited on an outermost face or an innermost face of the transparent substrate.

In certain aspects, the sealant is deposited on an innermost face of the transparent substrate and is positioned between the transparent substrate and either the first or the second electrode.

In certain aspects, the sealant is deposited on both the outermost face and innermost face of the transparent substrate, and the sealant deposited on the innermost face of the transparent substrate is positioned between the transparent substrate and either the first or the second electrode.

In certain aspects, the electrochromic device further includes a first bus bar for connecting said first transparent electrode to a first terminal of an external power source; and a second bus bar for connecting said second transparent electrode to a second terminal of an external power source.

Also disclosed herein is a method of making an electrochromic device. The method includes: (i) providing a transparent substrate; (ii) depositing on the transparent substrate a first transparent electrode comprising a conductive metal oxide configured to selectively gain and/or lose electrons upon selective application of electrical potential to the electrochromic device; (iii) depositing on the first transparent electrode a metal oxide and subsequently depositing on the metal oxide an alkali earth metal that reversibly intercalates the metal oxide thereby forming the first electrochromic layer on and in electrical contact with the first transparent electrode, the first electrochromic layer is configured to reversibly change from a colored state when intercalated with the alkali earth metal to a transparent state upon loss of a first amount of ions when de-intercalated with the alkali earth metal and electrons from the first electrochromic layer upon selective application of electrical potential to the electrochromic device; (iv) depositing on the first electrochromic layer an electrolyte layer formed on the first electrochromic layer and positioned between the first electrochromic layer and a second electrochromic layer, the electrolyte layer is configured to selectively transfer ions from the first electrochromic layer to the second electrochromic layer upon selective application of electrical potential between the first electrode and a second transparent electrode to change the electrochromic device from a low transparency state of approximately 10-20% transmittance in the visible region to a high transparency state of approximately 75% to 95% transmittance in the visible region with at least a 70% difference in transmittance between the low and high transmittance states; (v) depositing on the electrolyte layer a second electrochromic layer formed on the electrolyte layer, the second electrochromic layer comprises an electrochromic metal oxide and is configured to reversibly change from a colored state to a transparent state upon gaining an amount of ion-electron pairs that coincides with the loss of the first amount of ion-electron pair from the first electrochromic layer upon selective application of electrical potential to the electrochromic device; (vi) depositing on the second electrochromic layer a buffer layer formed on the second electrochromic layer and positioned between the second electrochromic layer and the second transparent electrode that is configured to maintain conductivity and stability of the electrochromic device while in use; and (vii) depositing on the buffer layer a second transparent electrode that is in electrical contact with the second electrochromic layer, the second transparent electrode comprises the same conductive metal oxide as the first transparent electrode and is configured to selectively gain and/or lose electrons upon application of selective electrical potential to the electrochromic device, wherein: the buffer layer promotes electron transfer between the second transparent electrode and second electrochromic layer while concurrently reducing or inhibiting deleterious chemical interaction between the second electrochromic layer and the second electrode and/or maintaining the conductive state of the second electrode while the electrochromic device changes from the low transparency state to the high transparency state.

In certain aspects, the buffer layer includes at least one of: a $NiO_{x1}$ layer configured to transfer electrons between the second electrode and second electrochromic layer, a metallic nickel (Ni) layer configured to react with and sequester excess oxygen from the second electrochromic layer to maintain a conductive state of the second electrode while the electrochromic device changes from the low transparency state to the high transparency state, and/or an oxygen deficient $ITO_x$ layer configured to react with and sequester excess oxygen from the second electrochromic layer to maintain a conductive state of the second electrode while the electrochromic device changes from the low transparency state to the high transparency state.

In certain aspects, the buffer layer is $NiO_{x1}$ layer where $x_1$ is $1.4 < x_1 < 1.45$ and the second electrochromic layer is NiOx where x is $1.0 < x < 1.45$.

In certain aspects, the second electrochromic layer includes nickel oxide (NiOx) in which x of NiOx is $1.3 < x < 1.5$ and the buffer layer comprises one of a metallic nickel (Ni) layer configured to react with and sequester excess oxygen from the second electrochromic layer to maintain a conductive state of the second electrode while the electrochromic device changes from the low transparency state to the high transparency state or an oxygen deficient ITOx layer configured to react with and sequester excess oxygen from the second electrochromic layer to maintain a conductive state of the second electrode while the electrochromic device changes from the low transparency state to the high transparency state.

In certain aspects, the first and second transparent electrodes each comprise a transparent conductive oxide (TCO).

In certain aspects, the first and second transparent electrodes are each selected from the group consisting of ITO, $SnO_2F$, ZAO (Al doped ZnO) fluorine doped tin, fluorine doped ZnO.

In certain aspects, the first and second transparent electrodes each comprise an indium tin oxide (ITO) layer.

In certain aspects, first electrochromic layer is a lithium tungsten oxide ($Li_xWO_3$) layer in which $x < 0.2$. x should remain less than 0.2 in order to limit and/or prevent intercalation of Li ions into the first transparent electrode (e.g., ITO1) thereby preventing the electrochromic device from becoming resistive and maintaining operability of the electrochromic device.

In certain aspects, the electrolyte layer is comprised of a lithium fluoro nitride layer ($LiF_xN_y$), and the ions are lithium (Li) ions. More preferably, the electrolyte layer is a lithium fluoro nitride layer ($LiF_xN_y$) and the electrochromic device further includes a LiNx ion transfer layer positioned between the first electrochromic layer and the electrolyte that facilitates lithium ion transport between the electrolyte and first electrochromic layers upon application of selective electrical potential to the electrochromic device.

In certain aspects, lithium (Li) ions intercalate and de-intercalate between the first and second electrochromic layers upon the application of a reverse electrical potential to facilitate the electrochromic device changing from the low transparency state at a voltage ranging from 1.5 V to 3.0 V with the first transparent electrode having a negative polarity to the high transparency state at 0.5V to 2.0V with the first transparent electrode having a positive polarity and vice versa upon reversing polarity.

In certain aspects, the second electrochromic layer comprises a nickel oxide (NiOx) wherein x of NiOx is 1.3<x<1.5.

In certain aspects, the transparent substrate is either planar or curved and is formed of either glass or polycarbonate. When curved, the transparent substrate can have a concave or convex shape. In addition, when the transparent substrate is polycarbonate, the polycarbonate may be further surface treating with, for example, an adhesion enhancing coating (comprised of Si and/or $SiO_2$) to increase adhesion between the substrate and electrode that is deposited thereon.

In certain aspects, sealant is deposited on an outermost face or an innermost face of the transparent substrate.

In certain aspects, the sealant is deposited on an innermost face of the transparent substrate and is positioned between the transparent substrate and either the first or the second electrode.

In certain aspects, the sealant is deposited on both the outermost face and innermost face of the transparent substrate, and the sealant deposited on the innermost face of the transparent substrate is positioned between the transparent substrate and either the first or the second electrode. In certain aspects, the devices disclosed herein may be used to block and/or reflect certain predetermined wavelengths (e.g., 630 nm to 950 nm) of laser light to provide a laser protective surface. Moreover and in certain aspects, these devices may be applied to mirrors (e.g., automobile mirrors) for various purposes such as dimming solar glare and/or active dark mirror applications. Moreover and in certain aspects, the electrochromic devices disclosed herein may be applied to transparent substrates (e.g., glass or polymeric substrates) and act as filter in part of the electromagnetic spectrum to selectively transmit and/or block and/or reflect predetermined wavelengths in optical glassware/eyewear (e.g., sunglasses, goggles, reading glasses and/or prescription glasses), window and/or a dynamic window system. Moreover and in certain aspects, the electrochromic devices disclosed herein may be combined and/or operably coupled with a photovoltaic device in which one electrode of electrochromic device can be used as electron connector of the photovoltaic device and the photovoltaic device provides energy to activate the electrochromic device.

Embodiments of the invention can include one or more or any combination of the above features and configurations.

Additional features, aspects, and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects, and advantages of the invention are better understood when the following detailed description is read with reference to the accompanying drawings, in which.

DETAILED DESCRIPTION

Figure 1B:
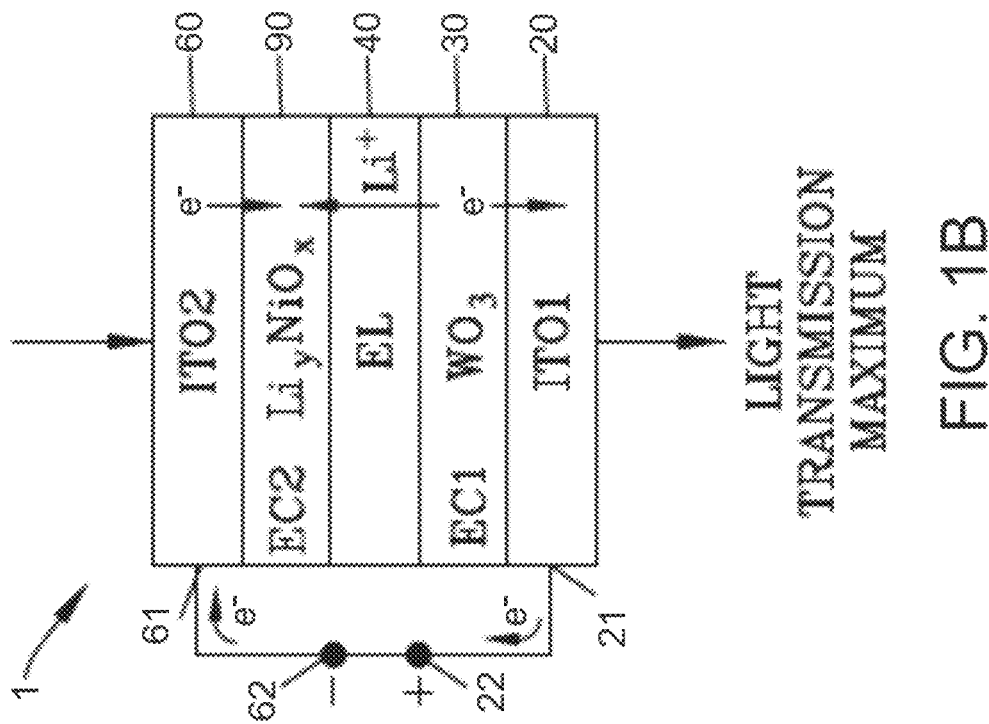
FIG. 1B is the electrochromic device of FIG. 1A in a maximum light transmitting state.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

As used herein, the term "about" is used to provide flexibility to a numerical range endpoint by providing that a given value may be "slightly above" or "slightly below" the endpoint without affecting the desired result.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

It should be further noted that "x", "x1", and "y" as disclosed in the equations and chemical formulae herein and within the Figures refer to atomic ratio, which should be readily apparent and understood by one skilled in the art. For example, techniques such as Rutherford Backscattering Spectroscopy (RBS) and X-Ray Photoelectron Spectroscopy (XPS) can identify the total number of oxygen atoms bonded/connected to/interacting with metal and oxidation states of oxides. ~530 eV region of XPS spectrum shows oxidation level(s) of bonding and intensity at that energy shows the number of molecules in a bound higher and/or reduced oxidation state(s).

It should be understood that the reference to a change/transition between a bleached state (also referred to as a clear or colorless state herein) and colored state is non-limiting and suggests only one example, among many, of an electrochromic transition that may be implemented. Unless otherwise specified herein, whenever reference is made to a bleached-colored transition, the corresponding device or process encompasses other optical state transitions such non-reflective-reflective, transparent-opaque, etc. Further the term "bleached" refers to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In certain embodiments, the materials comprising the disclosed electrochromic devices/electrochromic stacks are inorganic, solid (i.e., in the solid state), or both inorganic and solid. Because organic materials tend to degrade over time, inorganic materials offer the advantage of a reliable electrochromic stack that can function for extended periods of time. Materials in the solid state also offer the advantage of not having containment and leakage issues, as materials in the liquid state often do. Each of the layers in the electrochromic device is discussed in detail, below. It should be understood that any one or more of the layers in the stack may contain some amount of organic material, but in many implementations one or more of the layers contains little or no organic matter.

It should be further understood that "formed" or "deposited" herein refers to deposition processes known in the art (e.g., e-beam deposition, physical vapor deposition, chemical vapor deposition, etc.) to form the layers of the electrochromic devices and electrochromic stacks disclosed herein.

Exemplary Electrochromic Stack(s)/Device(s)

Reference numerals 1, 10, 10A, 1', 1", $1'''^a$, and $1'''^b$ as shown in FIGS. 1A, 1B, 2A-2D, 3A, 3B, 4, 5A-5D, respectively, refer to the exemplary layered stacks contemplated herein that are included within the contemplated electrochromic devices. For example, and as further discussed below, FIGS. 1A, 1B, and 2A-2D depict exemplary stacks included in electrochromic device(s) that are electrically connected to a power source that is configured to provide selective electrical potential (e.g., positive and/or negative polarity) to the exemplary stacks to selectively change/move electron(s) and ion(s) within the stack to further facilitate color change (e.g., from a colored state having low transmittance to a colorless/clear state having high transmittance or vice versa), transmittance, and reflectance therein while advantageously and concurrently maintaining operable conductivity of the device for extended periods of time.

It should be further understood that exemplary stacks 1', 1", 1'"$^a$, and 1'"$^b$ as shown in FIGS. 3A, 3B, 4, and 5A-5D, respectively can also be configured and connected to electrical power sources such as those shown in FIGS. 1A, 1B, 2A, and 2B and further exhibit the same and/or similar electron movement, ion movement, color change, transmittance, and/or reflectance as discussed immediately above. Based on this understanding, the exemplary stacks depicted in FIGS. 3A, 3B, 4, and 5A-5D may also be referred to as electrochromic devices immediately below and throughout this disclosure.

Figure 1A:
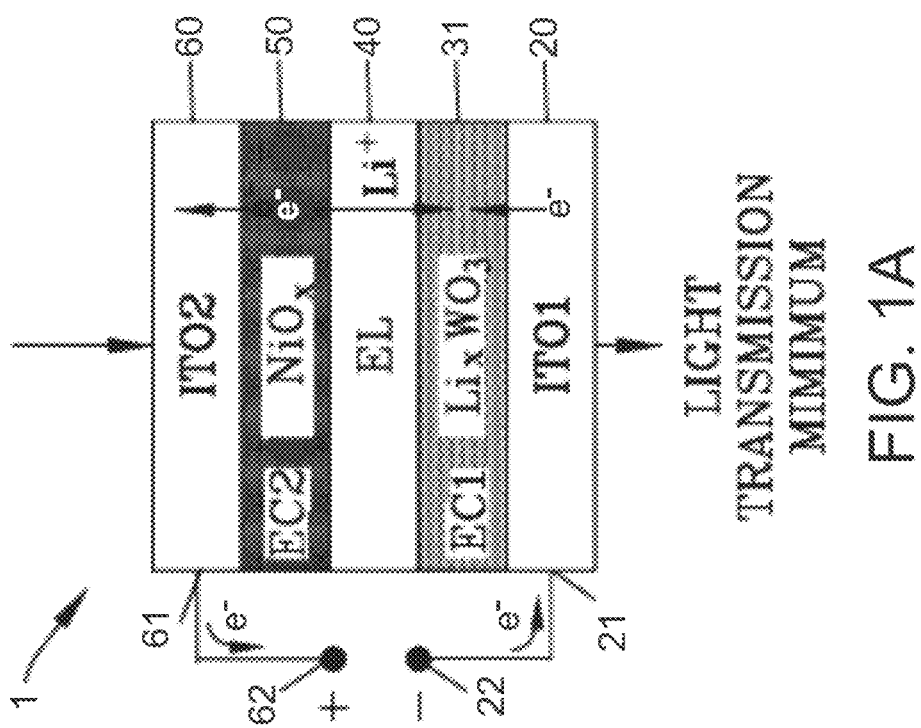
FIG. 1A is a sectional diagram of the operative components of an electrochromic device in a minimum light transmitting state.

FIGS. 1A and 1B are sectional views of an electrochromic device (ECD) 1 of the present invention in a colored state ("light transmission minimum" or dark state) and a clear state ("light transmission maximum" or colorless state), respectively. In the colored state shown in FIG. 1A, the electrochromic device (ECD) 1 transmits minimum light through the electrochromic device 1. In the clear state shown in FIG. 1B, the electrochromic device 1 transmits a maximum light through the electrochromic device 1. In view of the below disclosure(s), it should be further understood that in the minimum light transmission state (also referred to as "dark state" or "colored state") that the first electrochromic layer (EC1) includes both $WO_3$ (30) and $Li_xWO_3$ (31) while the second electrochromic layer includes NiOx (referred to as 50 or 51 depending on the embodiments shown in FIGS. 3A and 3B or FIGS. 4-5D). However, in a maximum light transmission state (also referred to as a "clear state" or a "colorless state") the first electrochromic layer (EC1) includes only $WO_3$ (30) due to lithium ion migration from this layer into the second electrochromic layer, with the second electrochromic layer including NiOx (referred to as 50 or 51 depending on the embodiments shown in FIGS. 3A and 3B or FIGS. 4-5D) as well as $Li_yNiO_x$ (referred to as 90 or 91 depending on the embodiments shown in FIGS. 3A and 3B or FIGS. 4-5D)

In further view of FIGS. 1A-5D, specifically disclosed are electrochromic device(s), including a first transparent electrode 20 comprised of a conductive metal oxide that as discussed further below may be deposited/formed on substrate 70, the first transparent electrode 20 is configured to selectively gain and/or lose electrons (e.g., shown as e$^-$ in FIGS. 1A and 1B) upon selective application of electrical potential (22, 62) to the electrochromic device; a first electrochromic layer 30, 31 (also referred to as "EC1" or ion storage layer as shown in FIGS. 3A, 3B, and 5A-5D) formed on and in electrical contact with the first transparent electrode 20, the first electrochromic layer 30 is configured to reversibly change from a colored state 30, 31 (e.g., $Li_xWO_3$ "dark" state) to a transparent state 30 (e.g., only 30 $WO_3$ "clear" state) upon loss of a first amount of ions (e.g., Li$^+$) and electrons (e$^-$) from the first electrochromic layer upon selective application of electrical potential to the electrochromic device; an electrolyte layer 40 formed on the first electrochromic layer 30 (or 30, 31 depending on the state of the electrochromic device) positioned between the first electrochromic layer 30 and a second electrochromic layer ("EC2" collectively shown as 50 or 50 90 depending on the state of the electrochromic device or 51 or 51, 91 depending on the state of the electrochromic device), the electrolyte layer 40 is configured to selectively transfer ions (e.g., Li$^+$) from the first electrochromic layer 31 to the second electrochromic layer (50, 90 or 51, 91) upon selective application of electrical potential between the first electrode and a second transparent electrode to change the electrochromic device from a low transparency state (FIGS. 3A, 4, 5A, 5B and FIGS. 10 and 13) of approximately 10-20% transmittance in the visible region to a high transparency state (FIGS. 3B, 5C, 5D and FIGS. 10 and 13) of approximately 75% to 95% transmittance in the visible region with at least a 70% difference in transmittance between the low and high transmittance states (FIGS. 13 and 14); the second electrochromic layer (50 or 51) formed on the electrolyte layer (40), the second electrochromic layer (50 or 51) comprises an electrochromic metal oxide and is configured to reversibly change from a colored state 50 or 51 (e.g., $NiO_x$ "colored"/"dark" state) to a transparent state 90, 91 (e.g., $Li_yNiO_x$ "clear" state) upon gaining an amount of ion-electron pairs (e.g., Li$^+$ and e$^-$) that coincides with the loss of the first amount of ion-electron pair (e.g., Li$^+$ and e$^-$) from the first electrochromic layer 31 upon selective application of electrical potential to the electrochromic device; a buffer layer 110, 201, or 301 formed on the second electrochromic layer (50 or 50, 90 depending on the state of the electrochromic device or 51 or 51, 91 depending on the state of the electrochromic device) and positioned between the second electrochromic layer and the second transparent electrode 60 that is configured to maintain conductivity and stability of the electrochromic device while in use; and the second transparent electrode 60 formed on the buffer layer 110, 201, or 301 and in electrical contact with the second electrochromic layer (50 or 50, 90 depending on the state of the electrochromic device or 51 or 51, 91 depending on the state of the electrochromic device) the second transparent electrode 60 comprises the same conductive metal oxide as the first transparent electrode 20 and is configured to selectively gain and/or lose electrons upon application of selective electrical potential to the electrochromic device, wherein: the buffer layer 110, 201, or 301 promotes electron transfer between the second transparent electrode and second electrochromic layer while concurrently reducing or inhibiting deleterious chemical interaction (e.g., oxidation) between the second electrochromic layer and the second electrode and/or maintaining the conductive state of the second electrode while the electrochromic device changes from the low transparency state to the high transparency state.

Figure 13:
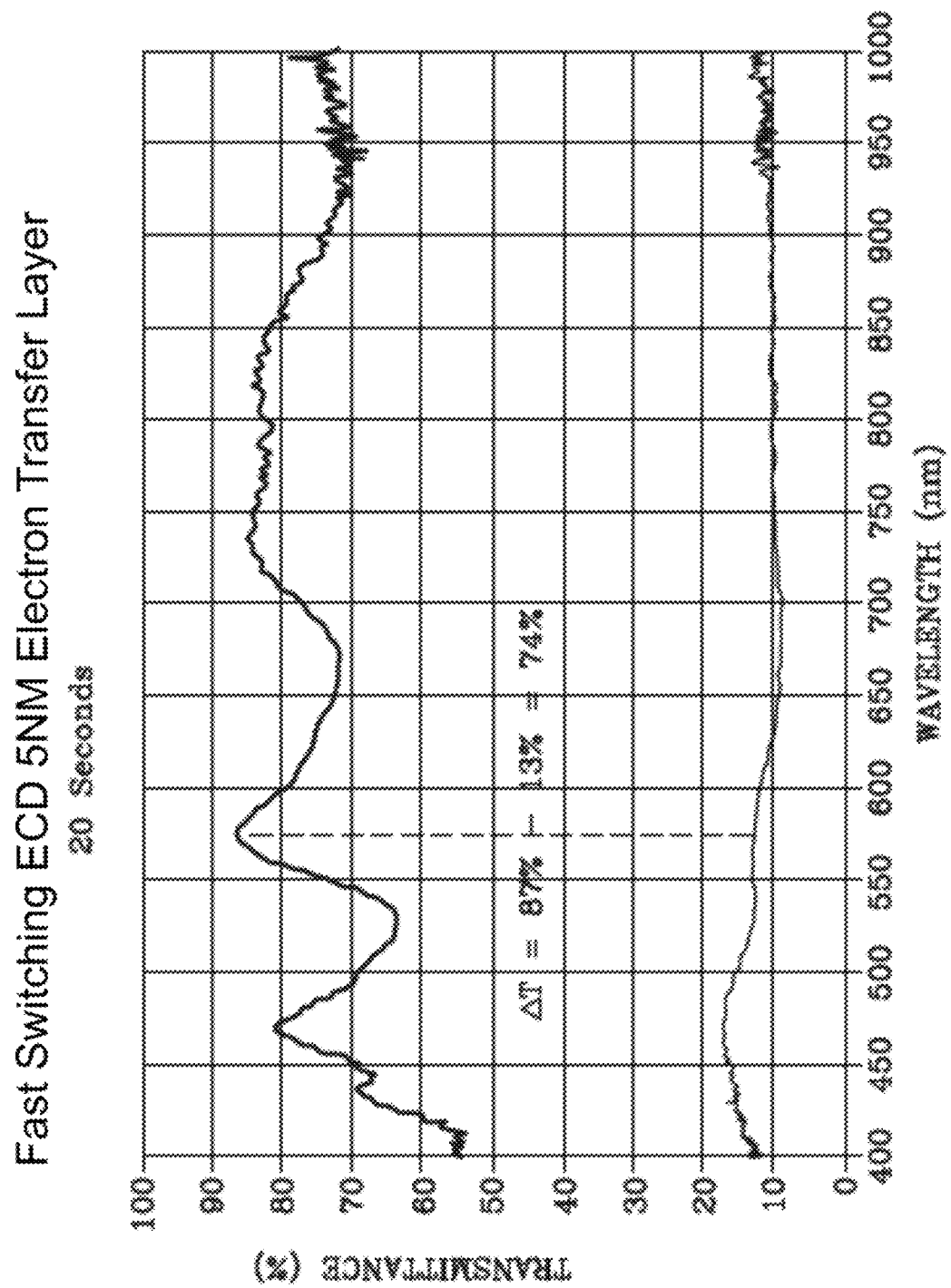
FIG. 13 is a graph depicting an electrochromic device having the disclosed electron transfer layer and the fast switching of the electrochromic device (ECD) between a clear state and a colored state transition spectra with a 74 percent (74%) visible modulation through the addition of an electron transfer layer.
Figure 14:
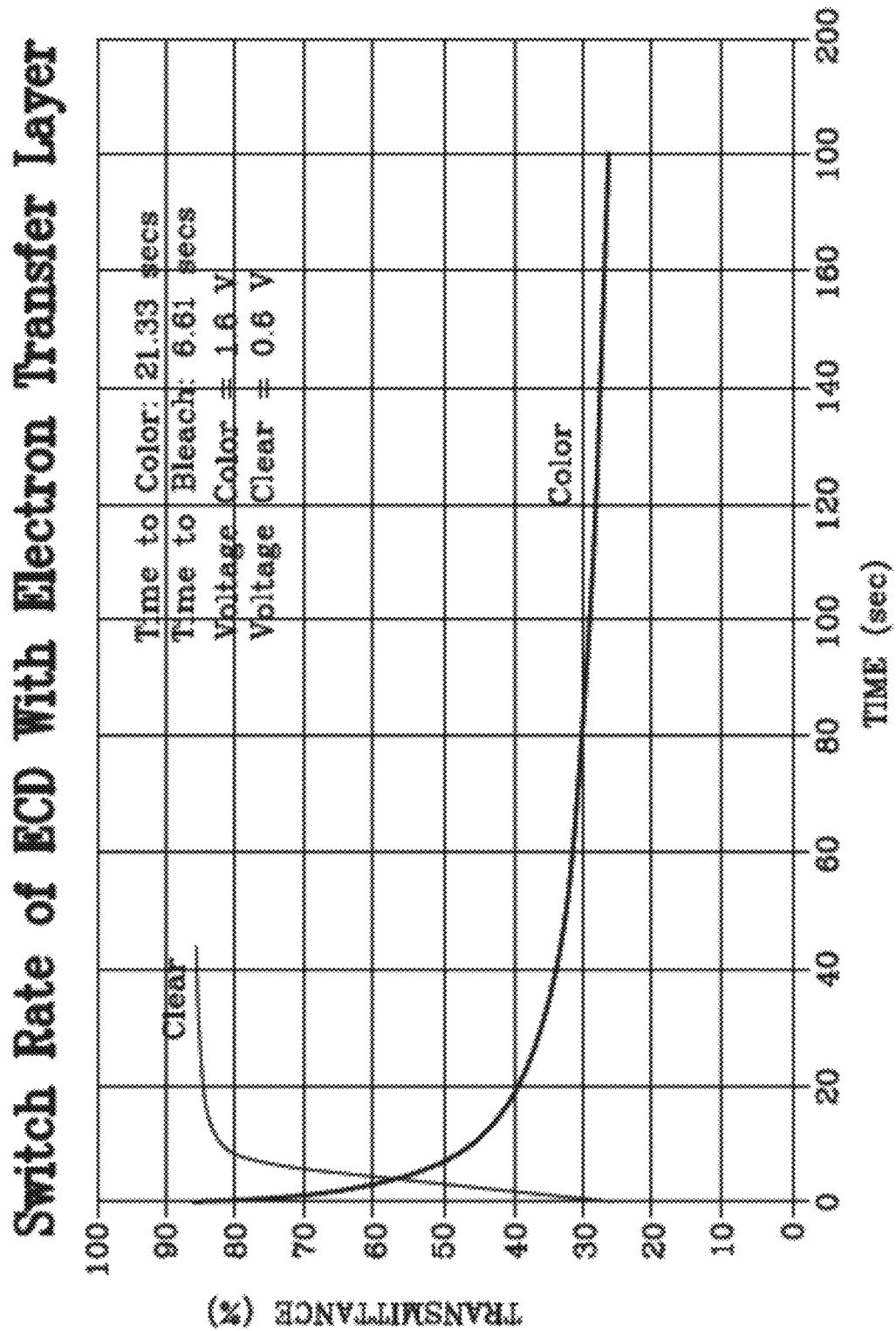
FIG. 14 is a graph depicting the switch rate of the electrochromic device (ECD) having the disclosed electron transfer layer between a clear state and a colored state transition spectra with the indicated applied voltage.

In certain aspects and as shown in FIG. 13, the electrochromic devices disclosed herein are configured to change from the low transparency state having a gray color (with, for example, 10 to 20% transmittance in the visible region) to the high transparency state (with, for example, at least 75% transmittance, at least 80% transmittance, at least 85% transmittance, at least 90% transmittance, or at least 95% transmittance) that is substantially colorless (and/or vice versa) within 30 seconds, 25 seconds, 20 seconds, 15 seconds, 10 seconds, or 5 seconds of applying the selective electrical potential to the electrochromic device.

In certain aspects and as shown, for example, in FIGS. 2A-2D and 3A-5D, a sealant 80 is deposited/formed over the second transparent electrode 60 to seal the overall stack/ device, which provides greater lifespan to the device by limiting interaction between the stack and ambient, atmospheric conditions.

Figures 2A, 2B:
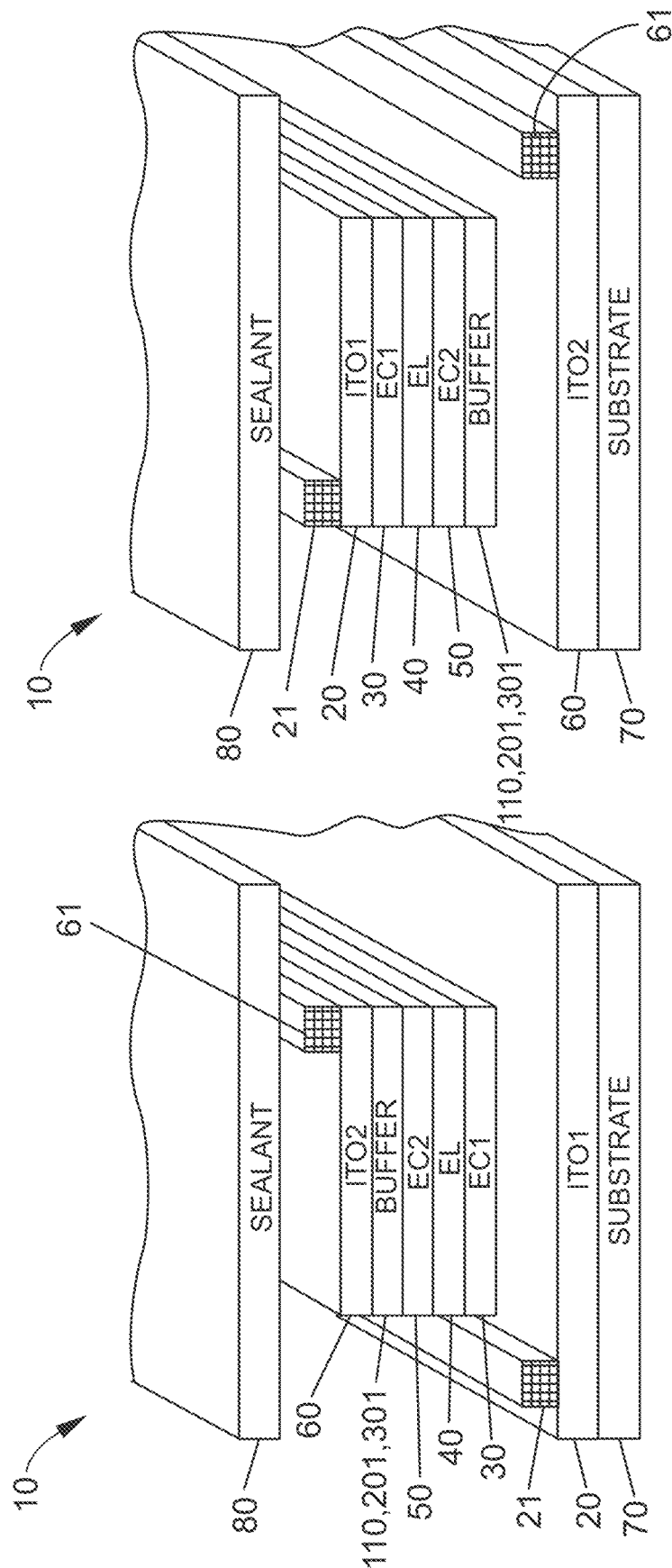
FIG. 2A is a partial isometric view of the physical configuration of the electrochromic device of FIGS. 1A and 1B being operably connected to bus bar(s)
FIG. 2B is a view similar to FIG. 2A depicting a reversal of the layers (i.e., electrochromic stack) in the electrochromic device.

FIGS. 2A and 2B depict various configurations of the contemplated electrochromic devices 10, 10A being operably connected to bus bars 21, 61. In view of FIGS. 2A and 2B, one skilled in the art would readily understand that the exemplary stacks in FIGS. 3A-5D can be adapted and connected to bus bars and power source(s) for use in a similar manner. Specifically FIG. 2A is a partial isometric view of the physical configuration of the electrochromic device 10 of FIGS. 1A and 1B. The first transparent conductive electrode 20 is formed on a substrate 70. Connecting bus bar 21 connects the first transparent conductive electrode 20 to the power source 22 as shown in FIGS. 1A and 1B. Preferably, the bus bars are formed from a metallic conductor or metallic particles suspended in a polymer. Bus bar 61 connects the second transparent conductive electrode 60 to the power source 62. A sealant 80 cooperates with the substrate 70 to encapsulate the electrochromic device 10. An example of a sealant 80 is set forth in U.S. Pat. No. 9,761,380 (incorporated by reference herein in its entirety). In this example, a buffer layer 110, 201, 301 is located between the second electrochromic layer and the second transparent conductive electrode 60 the function of which will be described in greater detail below.

Figure 2C:
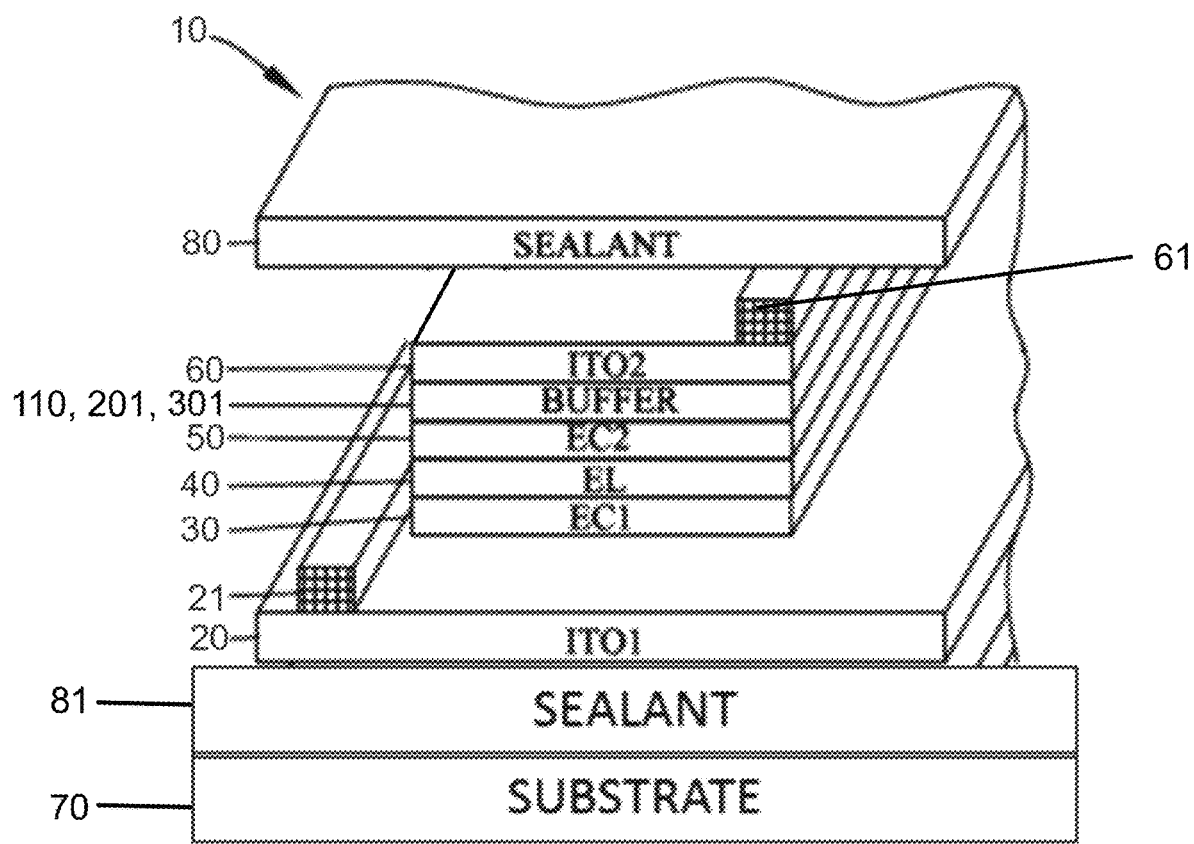
FIG. 2C depicts the configuration of FIG. 2A with an additional sealant layer deposited between the substrate and transparent electrode (ITO1)
Figure 2D:
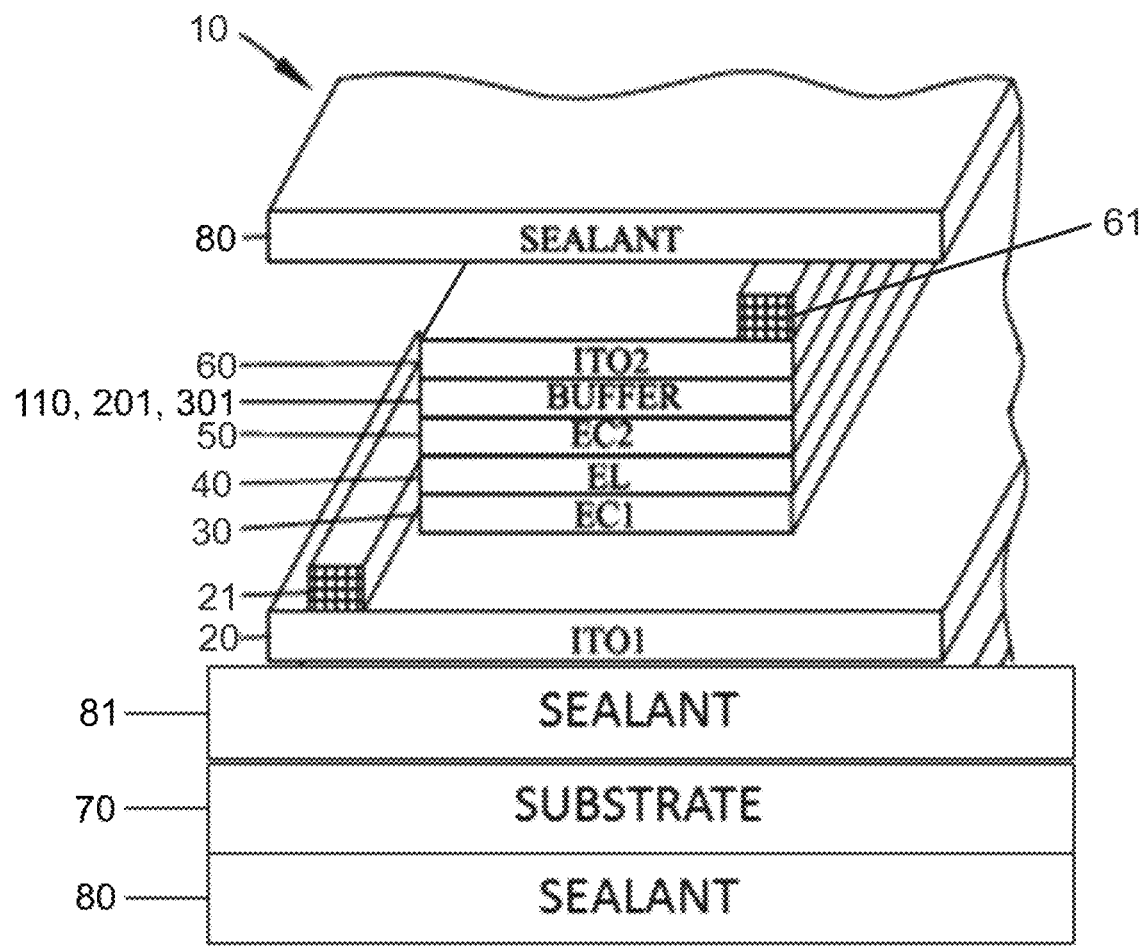
FIG. 2D depicts the configuration of FIG. 2C with sealant layers deposited on the outer and inner faces of the substrate.

FIG. 2B is an alternative embodiment of FIG. 2A illustrating a reversal of the layers of the electrochromic device 10. FIGS. 2C and 2D depict alternative arrangements of the electrochromic devices having differing arrangements of the sealant(s) 80, 81 disclosed herein. In certain aspects, the electrochromic devices disclosed herein may have various uses including, but not limited to, providing a laser protective surface by blocking and/or reflecting certain predetermined wavelengths of laser light. These wavelengths of laser light preferably range from 630 nm to 950 nm. Moreover and in certain aspects, these devices may be applied to mirrors (e.g., automobile mirrors) for various purposes such as dimming solar glare and/or active dark mirror applications. Moreover and in certain aspects, the electrochromic devices disclosed herein may be applied to transparent substrates (e.g., glass) and act as filter in part of the electromagnetic spectrum to selectively transmit and/or block and/or reflect predetermined wavelengths in optical glassware (e.g., sunglasses, goggles, reading glasses and/or prescription glasses), window and/or dynamic window system. Moreover and in certain aspects, the electrochromic devices disclosed herein may be combined and/or operably coupled with a photovoltaic device in which one electrode of electrochromic device can be used as electron connector of the photovoltaic device and the photovoltaic device provides energy to activate the electrochromic device.

Figure 16:
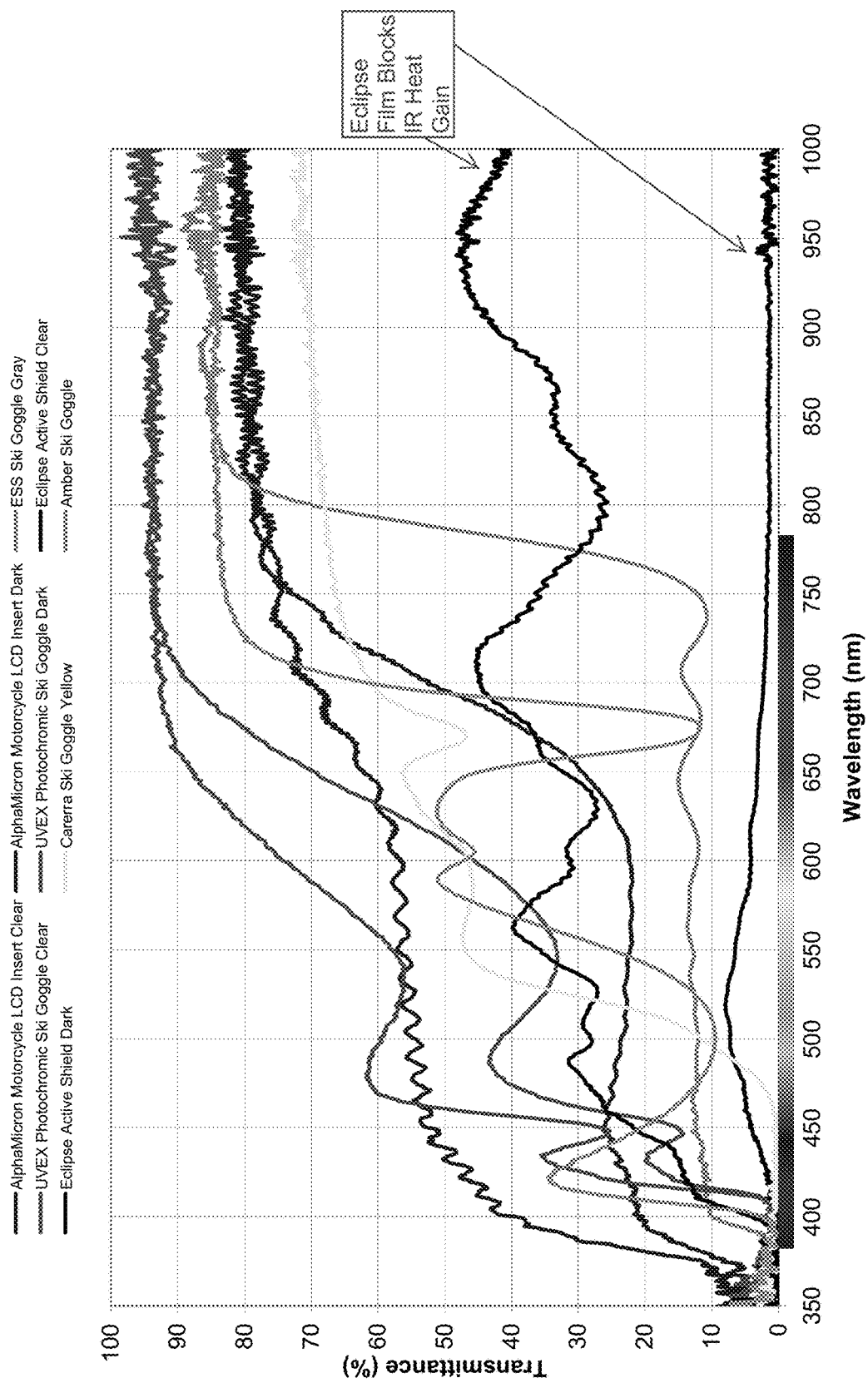
FIG. 16 is a graph depicting the visible and IR spectra of the electrochromic device (ECD) applied when applied to a substrate for use in ski goggles and further comparing these spectra to the visible and IR spectra of conventional ski goggles.

As alluded to above, the ECDs disclosed herein are included within, for example, optical glassware/eyewear such as sunglasses, goggles (e.g., ski goggles), reading glasses, and/or prescription glasses. In this instance, the substrate is a transparent substrate (i.e., either glass or polymeric substrate) in the form of an optical lens and the substrate has the ECD disclosed herein deposited thereon. The optical glassware that includes the disclosed ECD selectively reduces transmittance in the visible range (380 nm-760 nm), near IR ranges (760 nm-1,400 nm), and mid IR range (1,400 nm-3,000 nm) in which transmittance is less than 50%, 45%, 40%, 35%, 30%, 25%, 20%, 15%, 10%, and 5% in any combination of the visible, near R and mid IR ranges. Prolonged eye exposure to visible, near IR, and mid IR wavelengths are known to lead to various forms of eye damage, including but not limited to, retina damage (visible wavelengths ranging from 380-550 nm), cataract formation (near IR), cornea damage (mid IR) and iris damage (mid IR). Therefore, it is particularly advantageous to reduce transmittance in optical glassware (sunglasses, goggles (e.g., ski goggles), reading glasses, and/or prescription glasses) to reduce eye exposure to visible, near IR, and mid IR wavelengths, which in turn reduces and/or prevents eye damage associated with exposure to these particular wavelengths. Moreover, FIG. 16 depicts a proof of concept in which FIG. 16 provides a graph depicting the visible and IR spectra of the electrochromic device (ECD) applied when applied to a substrate for use in Ski Goggles and further comparing these spectra to the visible and IR spectra of conventional Ski Goggles.

Method of Making Exemplary Electrochromic Device(s)

In view of the exemplary layered stacks and/or electrochromic devices depicted in FIGS. 1A-5D, further disclosed below is a method of making the electrochromic devices disclosed herein. Any deposition process known in the art (e.g., e-beam deposition, physical vapor deposition, chemical vapor deposition, etc.) may be used to form the layers of the electrochromic devices and electrochromic stacks disclosed herein so that the disclosed parameters and characteristics of the electrochromic devices disclosed herein are achieved. Specifically disclosed is a method of making an electrochromic device, including: providing a transparent substrate 70 (alternatively and in the application of mirror applications the substrate may be a mirror instead of a transparent substrate); depositing on the transparent substrate a first transparent electrode 20 comprising a conductive metal oxide, the first transparent electrode 20 configured to selectively gain and/or lose electrons (e) upon selective application of electrical potential to the electrochromic device; depositing on the first transparent electrode a metal oxide (e.g., $WO_3$) and subsequently depositing on the metal oxide an alkali earth metal 100 (e.g., metallic lithium or $LiN^x$) that reversibly intercalates the metal oxide thereby forming the first electrochromic layer (having both $WO_3$ 30 and $Li_xWO_3$ 31 respectively in a colored/dark state) on and in electrical contact with the first transparent electrode 20, the first electrochromic layer is configured to reversibly change from a colored state when intercalated with the alkali earth metal (e.g., $Li_xWO_3$ (31)) to a transparent state upon loss of a first amount of ions (e.g., $Li^+$) when de-intercalated with the alkali earth metal and electrons (e) from the first electrochromic layer upon selective application of electrical potential to the electrochromic device; depositing on the first electrochromic layer 30, 31 (and the ion transfer layer 100) an electrolyte layer 40 (e.g., $LiF_xN_y$ formed by depositing lithium fluoride in a nitrogen atmosphere) formed on the first electrochromic layer and positioned between the first electrochromic layer 30, 31 and a second electrochromic layer 50 or 51, the electrolyte layer 40 is configured to selectively transfer ions (e.g., $Li^+$) from the first electrochromic layer to the second electrochromic layer upon selective application of electrical potential between the first electrode and a second transparent electrode to change the electrochromic device from a low transparency state (e.g., FIGS. 3A, 4, 5A, 5B, and FIG. 10) of approximately 10-20% transmittance in the visible region to a high transparency state (e.g., FIGS. 3B, 5C, 5D, and FIG. 10) of approximately 75% to 95% transmittance in the visible region with at least a 70% difference in transmittance between the low and high transmittance states; depositing on the electrolyte layer 40 a second electrochromic layer 50 or 51 formed on the electrolyte layer, the second electrochromic layer comprises an electrochromic metal oxide and is configured to reversibly change from a colored state 50 or 51 to a transparent state (50, 90 as shown in FIG. 3B or 51, 91 as shown in FIGS. 5C and 5D) upon gaining an amount of ion-electron pairs (e.g., $Li^+$ and $e^-$) that coincides with the loss of the first amount of ion-electron pair (e.g., $Li^+$ and $e^-$) from the first electrochromic layer upon selective application of electrical potential to the electrochromic device; depositing on the second electrochromic layer 50 or 51 a buffer layer 110, 201, or 301 formed on the second electrochromic layer and positioned between the second electrochromic layer and the second transparent electrode that is configured to maintain conductivity and stability of the electrochromic device while in use; and depositing on the buffer layer 110, 201, or 301 the second transparent electrode 60 that is in electrical contact with the second electrochromic layer, the second transparent electrode 60 comprises the same conductive metal oxide as the first transparent electrode 20 and is configured to selectively gain and/or lose electrons upon application of selective electrical potential to the electrochromic device, and depositing a sealant over the second electrochromic layer, wherein: the buffer layer 110, 201, or 301 promotes electron transfer between the second transparent electrode and second electrochromic layer while concurrently reducing or inhibiting deleterious chemical interaction(s) between the second electrochromic layer and the second electrode and/or maintaining the conductive state of the second electrode while the electrochromic device changes from the low transparency state to the high transparency state.

Substrates

Figure 15:
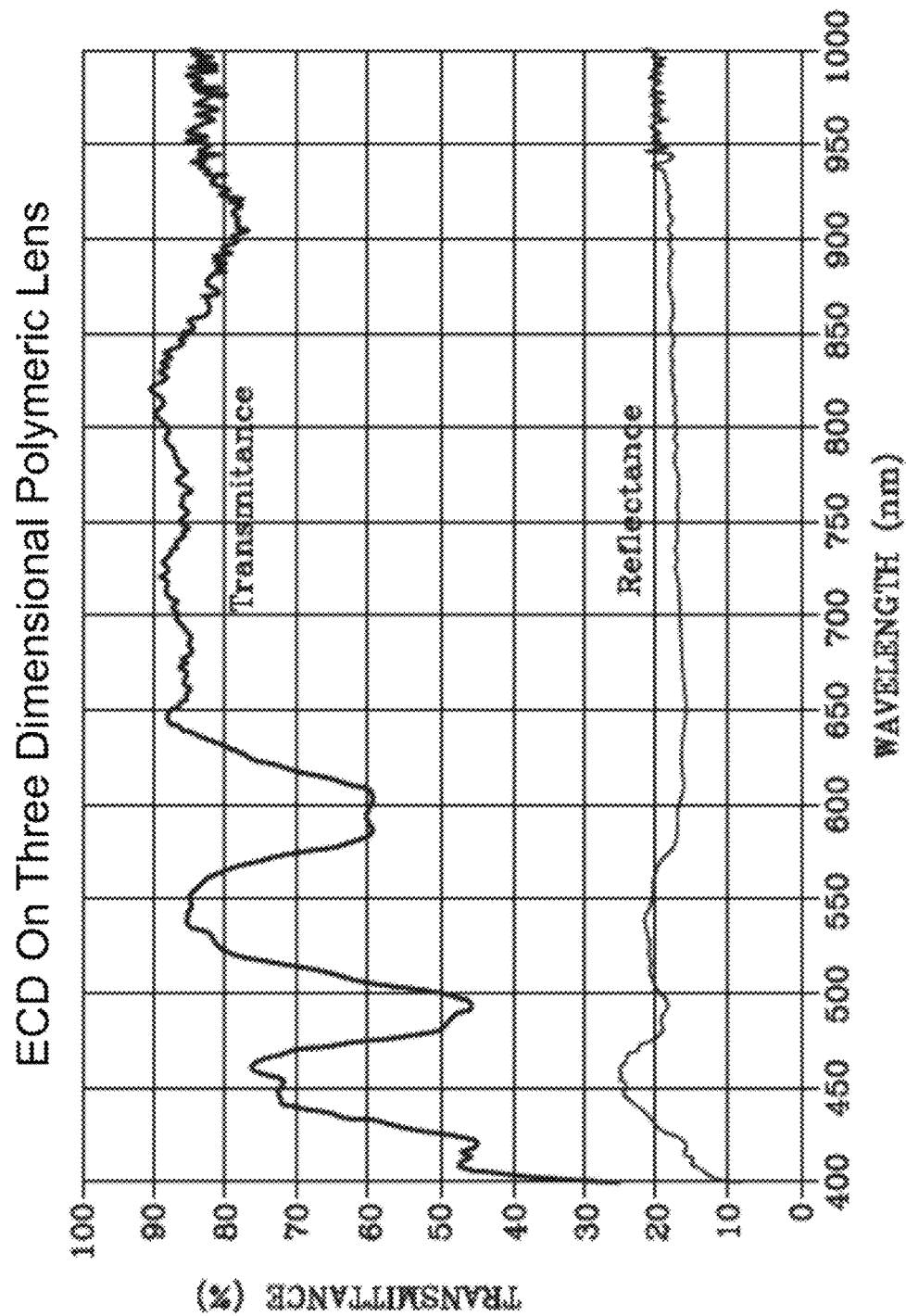
FIG. 15 is a graph depicting the spectra of the electrochromic device (ECD) applied to a three dimensional polymeric lens.

As shown in FIGS. 2A-5D, the electrochromic devices and stacks disclosed herein preferably include a substrate 70 on which the electrochromic stack is/are formed/deposited. More specifically, and as further shown in the exemplary depictions in FIGS. 2A-2D, one of the transparent electrodes disclosed herein (e.g., 20 or 60) is deposited/formed on the substrate when making the disclosed electrochromic devices. In view of FIGS. 2A-5D, any material having suitable optical, electrical, thermal, and mechanical properties may be used as substrate 70, and these substrates may have any desired predetermined shape (e.g., planar surface(s), curved surface(s) such as a concave or convex shape forming a lens). Such substrates include, for example, glass, polymeric substrates (e.g., plastic(s)), and/or mirror materials. In view of the above, FIG. 15 further shows the spectra of the electrochromic device (ECD) applied to a three dimensional polymeric lens/substrate.

Suitable plastic substrates include, for example, polyethylene terephthalate (PET), biaxially-oriented polyethylene terephthalate (BoPET)(Mylar or Melinex), acrylic, polystyrene, polycarbonate, allyl diglycol carbonate, SAN (styrene acrylonitrile copolymer), poly(4-methyl-1-pentene), polyester, polyamide, etc. If a plastic substrate is used, it is preferably barrier protected (referred to as sealant 80, 81 in FIGS. 2C, 2D, 5C, and 5D) and abrasion protected using a hard coat of, for example, a diamond-like protection coating, a silica/silicone anti-abrasion coating, or the like.

Suitable glass(es) includes either clear or tinted soda lime glass, including soda lime float glass. The glass may be tempered or untempered. In some embodiments of electrochromic device with glass, e.g. soda lime glass, used as substrate, there is a sodium diffusion barrier layer (also referred to as sealant 80, 81) between substrate and conductive layer to prevent the diffusion of sodium ions from the glass into conductive layer.

As discussed above and as further shown in FIGS. 2C, 2D, 5C, and 5D, in certain aspects a sealant 80, 81 is included with in the electrochromic stacks disclosed herein. In certain aspects, and as further shown in FIGS. 2C, 2D, 5C, and 5D, a sealant 80 is deposited on an outermost face of the substrate and/or a sealant 81 is deposited innermost face of the transparent substrate. With specific regarding to FIGS. 2C, 2D, 5C, and 5D, in certain aspects, the sealant 81 is deposited on an innermost face of the transparent substrate and is positioned between the transparent substrate and either the first or the second electrode (e.g., ITO1 or ITO2). In a further aspect and as shown in FIG. 2, the sealant 80 is also deposited on both the outermost face of the substrate 70.

Transparent Electrode(s)

The transparent electrodes 20, 60 disclosed herein are transparent conductive oxide(s)(TCO). In certain aspects, the first and second transparent electrodes 20 and 60 disclose herein are formed from indium tin oxide (ITO). Alternatively, the first transparent electrode may be selected from the group consisting of ITO, $SnO_2F$, ZAO (Al doped ZnO) fluorine doped tin, fluorine doped ZnO. The transparent electrodes are conductive—preferably facilitating electron movement within the electrochromic device. Thickness of each transparent electrode ranges from ~00 nm to 300 nm (with any endpoints within this range further serving as an endpoint for additional, narrower range(s)) having ~50 to 15 Ohm/sq sheet resistance and conductance being ~50,000 S/cm and transmittance ranging from 85% to 90%. In certain aspects, the bottom electrode (e.g., 20 in FIGS. 2A-2D) is thicker and has lower sheet resistance than, for example, the upper electrode (e.g., 60 in FIGS. 2A-2D), which is thinner than the bottom electrode and tends to be stress and haze free due to its thinner thickness when compared to the upper electrode.

Figure 6:
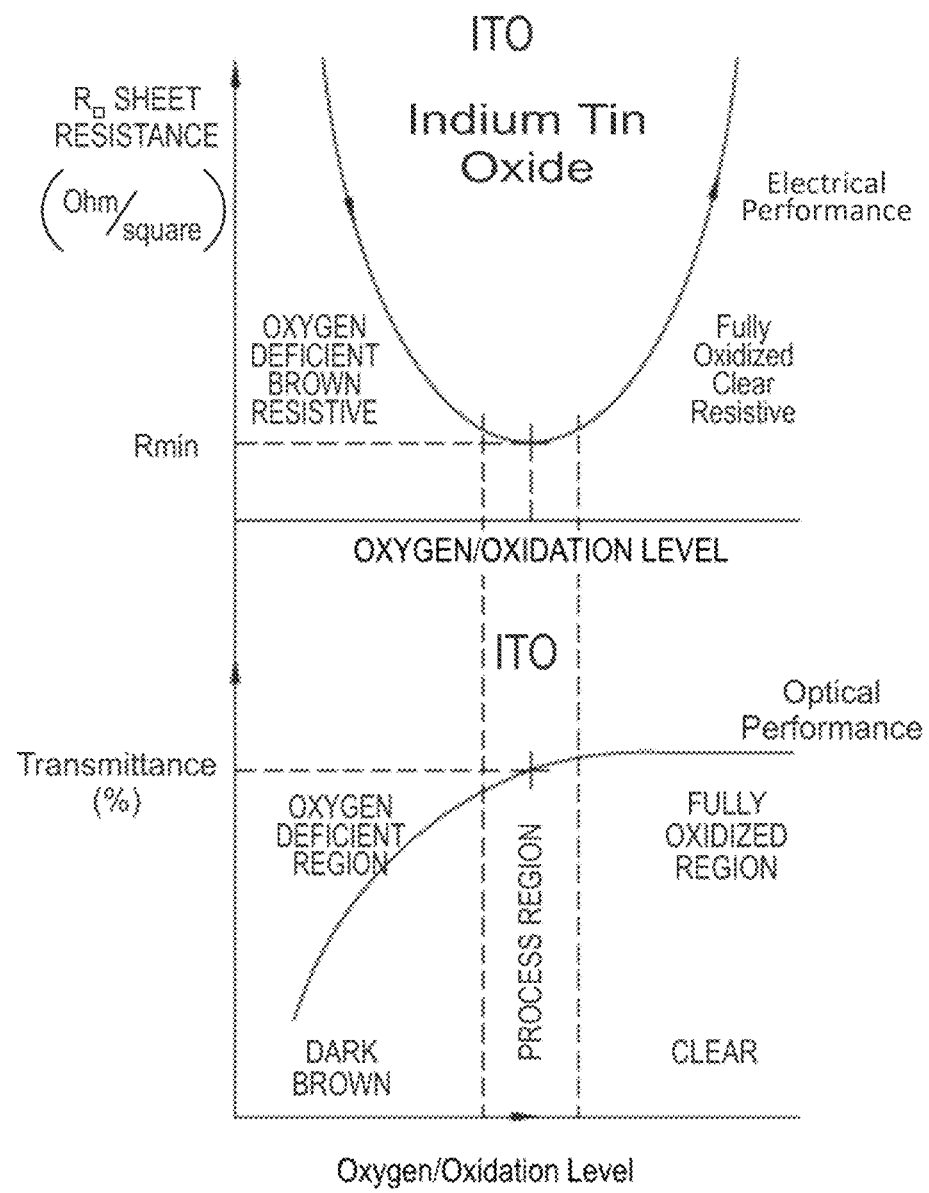
FIG. 6 is a dual graph with the upper portion of the graph depicting sheet resistance of the Indium Tin Oxide (ITO) film as a function of the oxygen/oxidation level and with the lower portion of the graph depicting the percentage of light transmission of the Indium Tin Oxide (ITO) film as a function of the oxygen/oxidation level.

In certain preferred aspects, the transparent electrodes included in the electrochromic stacks/devices are formed from indium tin oxide (ITO) 20, 60. A specific example of the deposition of indium tin oxide (ITO) 20, 60 transparent electrode is set forth in FIG. 6. Specifically, FIG. 6 is a dual graph with the upper portion of the illustrating the sheet resistance of the Indium Tin Oxide (ITO) film as a function of the oxygen/oxidation level and with the lower portion of the graph illustrating the percentage of light transmission of the Indium Tin Oxide (ITO) film as a function of the oxygen/oxidation level. Resistance of ITO film is high in oxygen deficient and highly oxidized states but shows a sharp minimum in its appropriate oxidation level which is called process region. In the process region ITO is conductive and transparent. Film thickness of each Indium Tin Oxide (ITO) electrode 20, 60 ranges from ~100 nm to 300 nm (with any endpoints therein further serving as an endpoint for additional, narrower range(s)) having ~50 to 15 Ohm/sq sheet resistance and conductance being ~50,000 S/cm and transmittance ranging from 85% to 90%. In certain aspects, the bottom ITO electrode (e.g., 20 in FIGS. 2A-2D) is thicker and has lower sheet resistance than, for example, the upper ITO electrode (e.g., 60 in FIGS. 2A-2D). In certain aspects, the ITO films/electrodes do not exceed ~250 nm in thickness due to a slight haze appearing upon exceeding this thickness.

Figure 11:
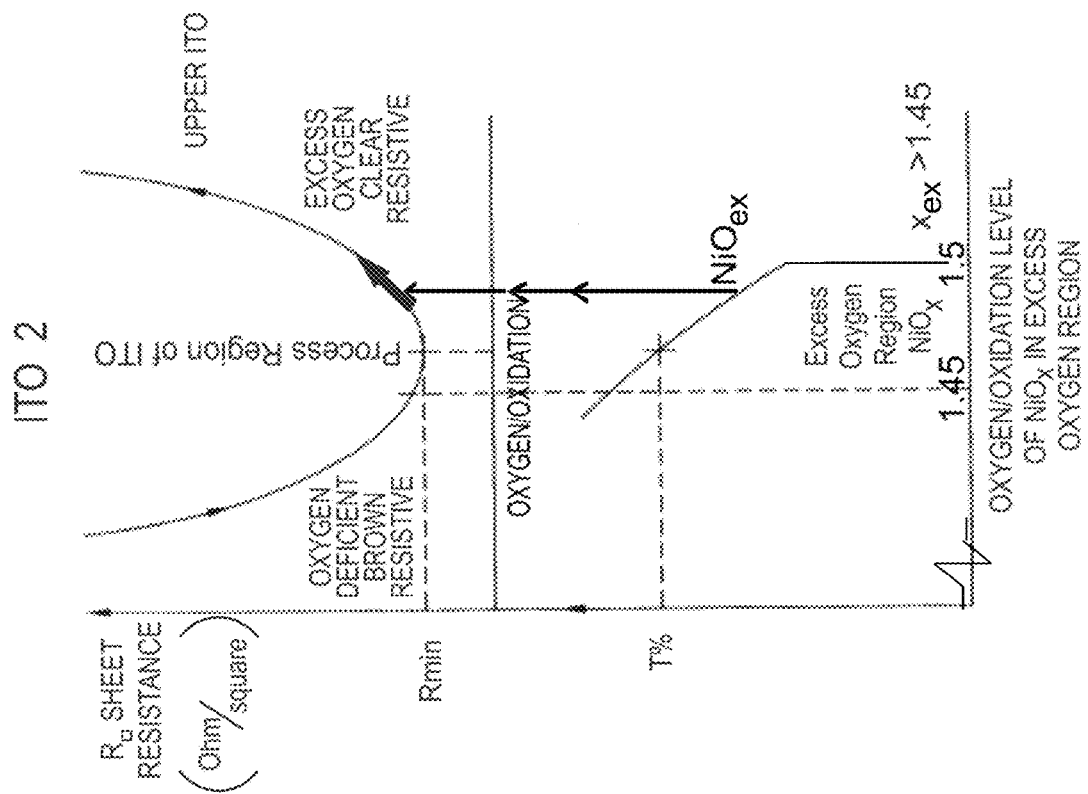
FIG. 11 is a dual graph with the upper portion of the graph depicting sheet resistance of the Indium Tin Oxide (ITO2) film as a function of the oxygen/oxidation level and with the lower portion of the graph depicting the percentage of light transmission of the EC2 layer ($NiO_X$) as a function of the oxygen/oxidation level.

FIG. 11 further depicts a dual graph with the upper portion of the graph depicting sheet resistance of the Indium Tin Oxide (ITO2) film as a function of the oxygen/oxidation level and with the lower portion of the graph depicting the percentage of light transmission of the second electrochromic layer EC2 layer (NiO$_X$) 50 or 51 as a function of the oxygen/oxidation level.

First Electrochromic Layer

In certain aspects and as further discussed in Example 2 below, the first electrochromic layer (EC1) preferably comprises tungsten oxide (WO$_3$) 30 and lithium tungsten oxide (Li$_x$WO$_3$) 31 wherein this electrochromic layer serves as an ion storage layer storing lithium ions (referred to as "Li" and/or "Li$^+$") while the electrochromic stack/electrochromic device is in a colored, minimally transmissive state (e.g., as shown in FIGS. 3A, 4, 5A, and 5B) and is further configured to selectively donate lithium ions to the electrolyte 40 and second electrochromic layers 90, 91 and electrons the first transparent electrode 20 upon application of selective electrical potential to this layer. As further shown in FIGS. 3A and 3B, x of lithium tungsten oxide (Li$_x$WO$_3$) is the molecular fraction of Li per WO$_3$ molecule with the upper limit of it at ITO1/WO$_3$ boundary being measured by titration experiment(s) and defined as x≤0.22. When making the electrochromic devices disclosed herein, lithium loading levels are controlled such that x does not exceed 0.22 thereby ensuring that the adjacent transparent electrode (e.g., ITO1) does not become exceedingly resistive and/or darker such that operability of the electrochromic device is affected while in use.

As further indicated in FIG. 3B (and FIGS. 7 and 8) and upon application of selective electrical potential to the electrochromic device, the first electrochromic layer 30, 31 reversibly changes from a dark state (minimum transmission state) to a clear state 30 (maximum transmission state) by donating lithium ions (Li$^+$) to the electrolyte layer and electrons (e$^-$) to the first transparent electrode (ITO1 or 20) according to the following:

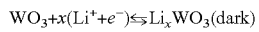

$$WO_3+x(Li^++e^-) \leftrightarrows Li_xWO_3 (dark)$$

Figure 7:
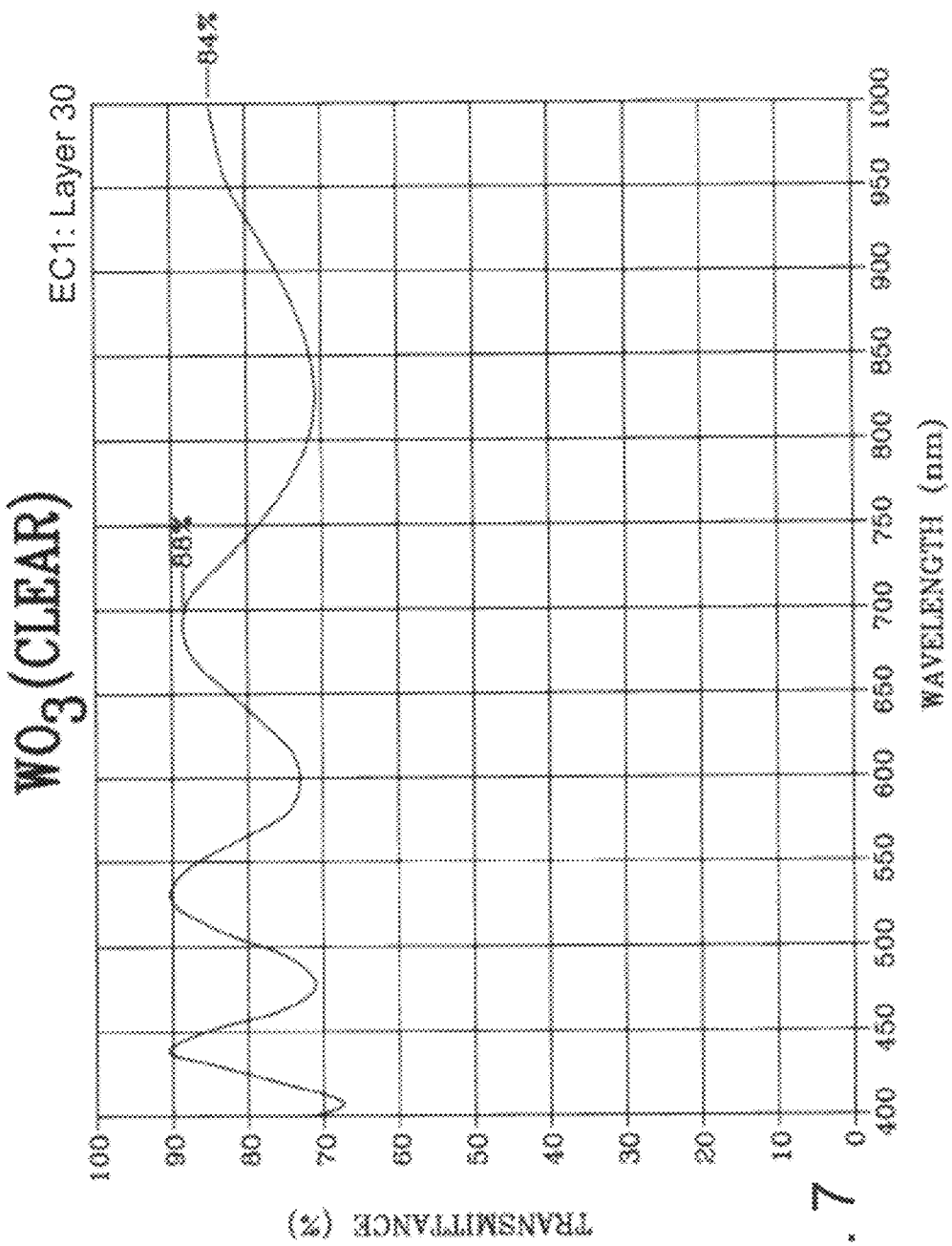
FIG. 7 is a graph depicting the percentage of light transmission as a function of wavelength for the electrochromic layer 1 (EC 1) of $WO_3$ before being intercalated with lithium (Li)
Figure 8:
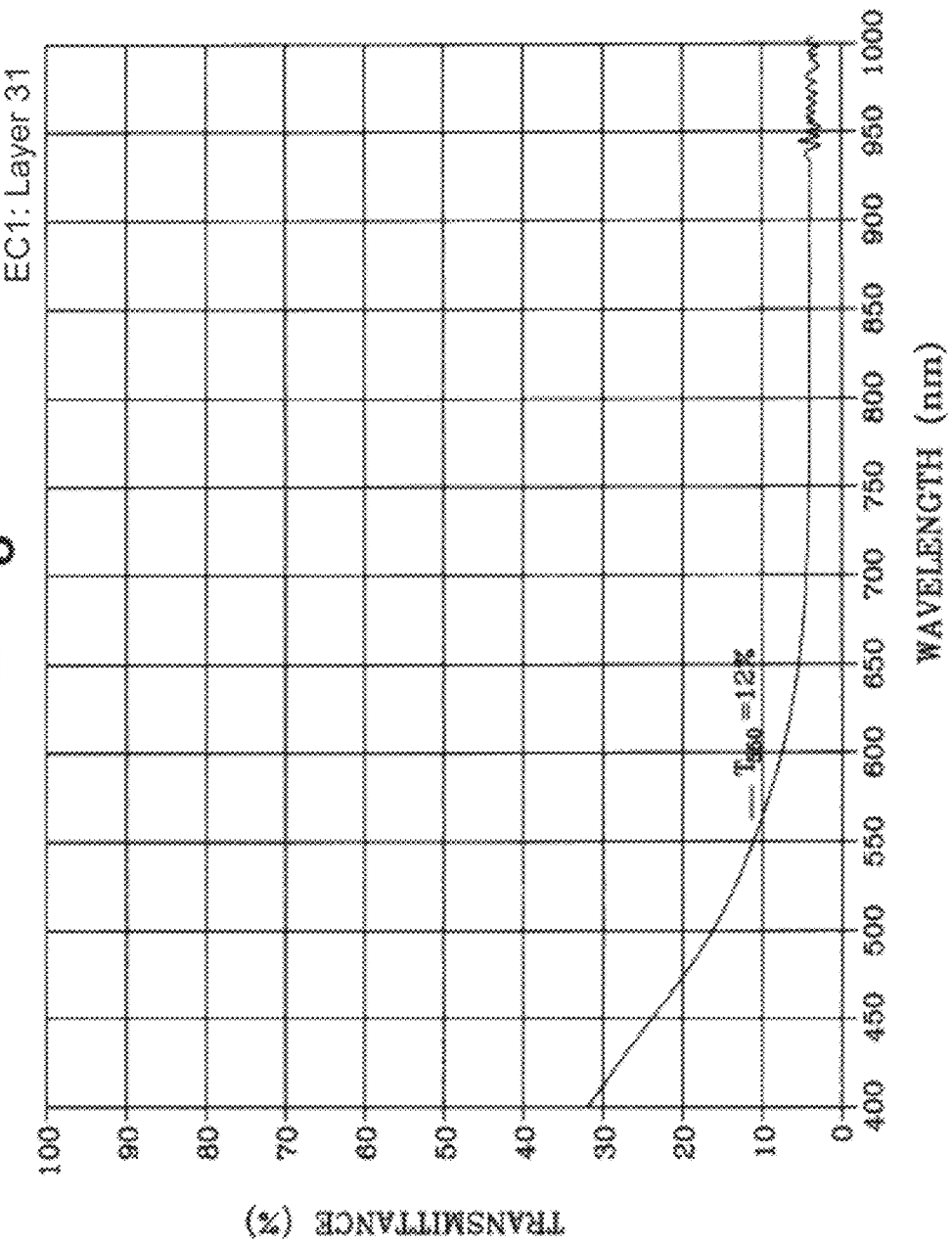
FIG. 8 is a graph depicting the percentage of light transmission as a function of wavelength for the electrochromic layer 1 (EC 1) of $Li_xWO_3$ film after being intercalated with lithium (Li)

For example, FIG. 8 depicts the first electrochromic layer 30, 31 being intercalated with lithium and having a blue (or dark) state in which transmittance of this layer (and the overall electrochromic stack/electrochromic device) is low in the visible region (e.g., ~12% at a wavelength of 550 nm) while FIG. 7 depicts the spectral transmission of WO$_3$ in the visible region when this layer is not intercalated with Li ions (e.g., FIGS. 3B, 5C, 5D).

Ion Transfer

In certain aspects, the electrochromic stacks and devices disclosed herein further include an ion transfer layer 100 (e.g., LiNx) formed over the first electrochromic layer (and positioned between the first electrochromic layer and electrolyte layer), which further facilitates movement of lithium ions (Li$^+$) between the first electrochromic layer 30 (or 30, 31 depending on the state of the electrochromic device) and the electrolyte 40 while applying selective electrical potential to the disclosed devices to achieve the desired state (colored or clear state).

Electrolyte Layer

As discussed in further detail in Example 4 below, the electrolyte layer 40 is a solid inorganic nanocomposite film formed on the ion transfer layer 100. The electrolyte layer 40 is formed by depositing Fluorine (F) along with the deposition of nitrogen N and lithium Li. The deposition of fluorine (F), nitrogen (N), and lithium (Li) forms an electrolyte of LiF$_x$N$_y$. LiF$_x$—LiN$_y$ where x is approximately 75%-95% and y is approximately 5%-25%. LiF$_x$N$_y$ has a glass-like transparency and low refractive index, n~1.5, with a dielectric constant of 6-8 and breakdown field of ~5 MV. LiF$_x$N$_y$ is an excellent Li conductor and excellent electron insulator and is thus included in the disclosed electrochromic stacks/devices for this reason.

Second Electrochromic Layer

Figure 3A:
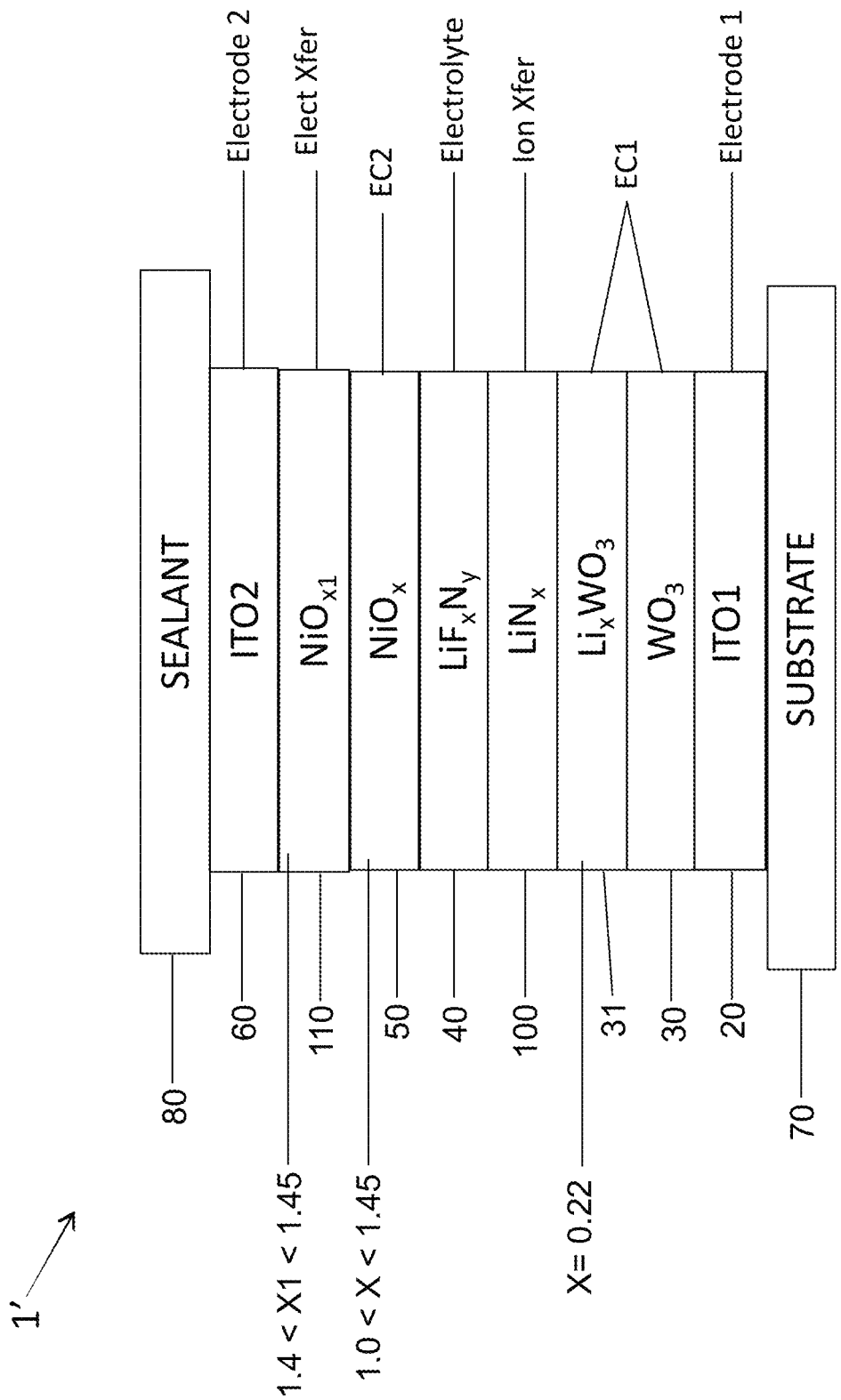
FIGS. 3A and 3B each depict sectional diagrams of an electrochromic device of the present invention having an electron transfer layer deposited between the second transparent electrode (ITO2) and electrochromic layer (EC2) with FIG. 3A specifically depicting the electrochromic device in a dark/minimum light transmitting state and FIG. 3B depicting a clear, maximum light transmitting state.
Figure 3B:
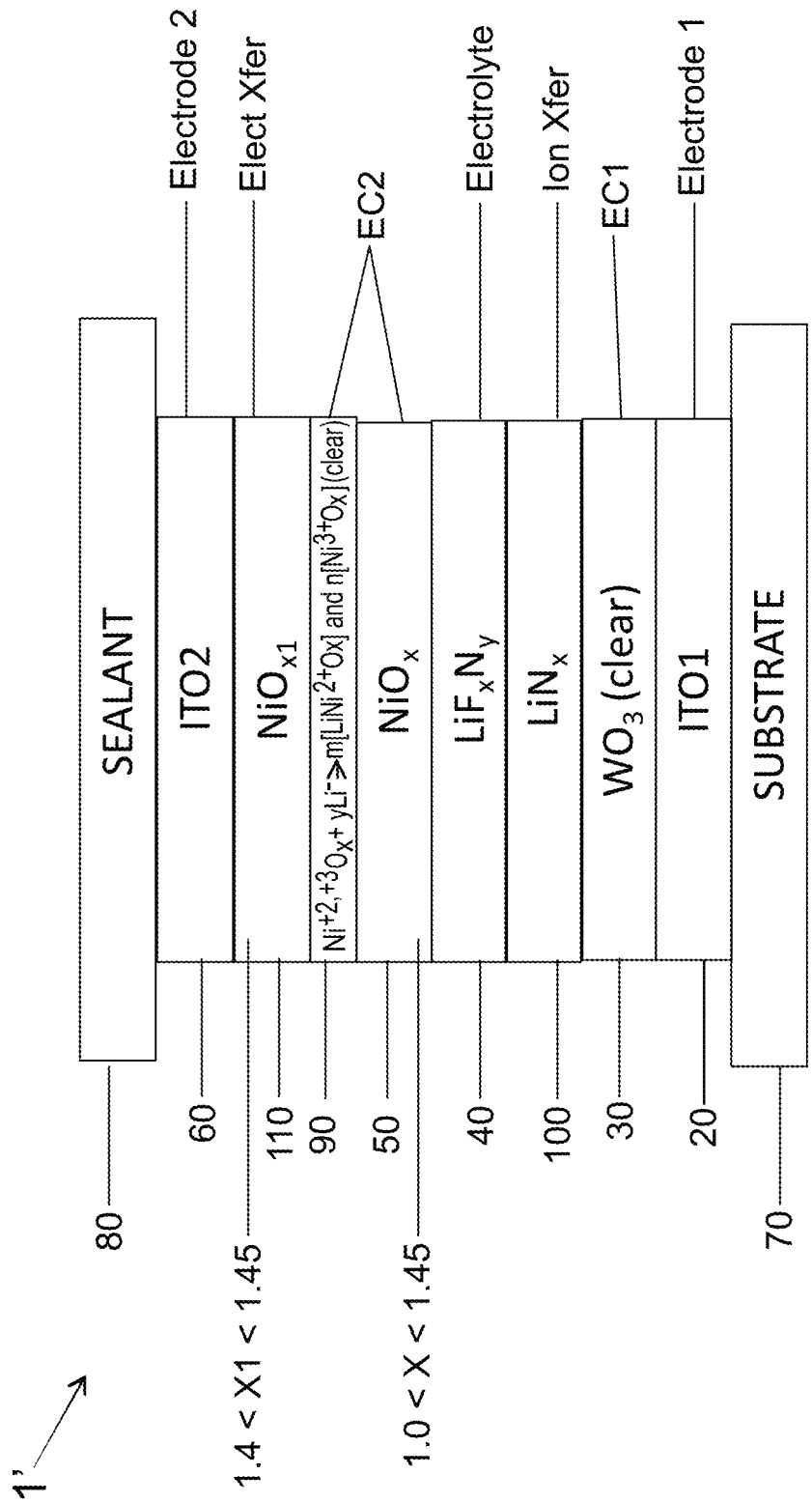
Figure 4:
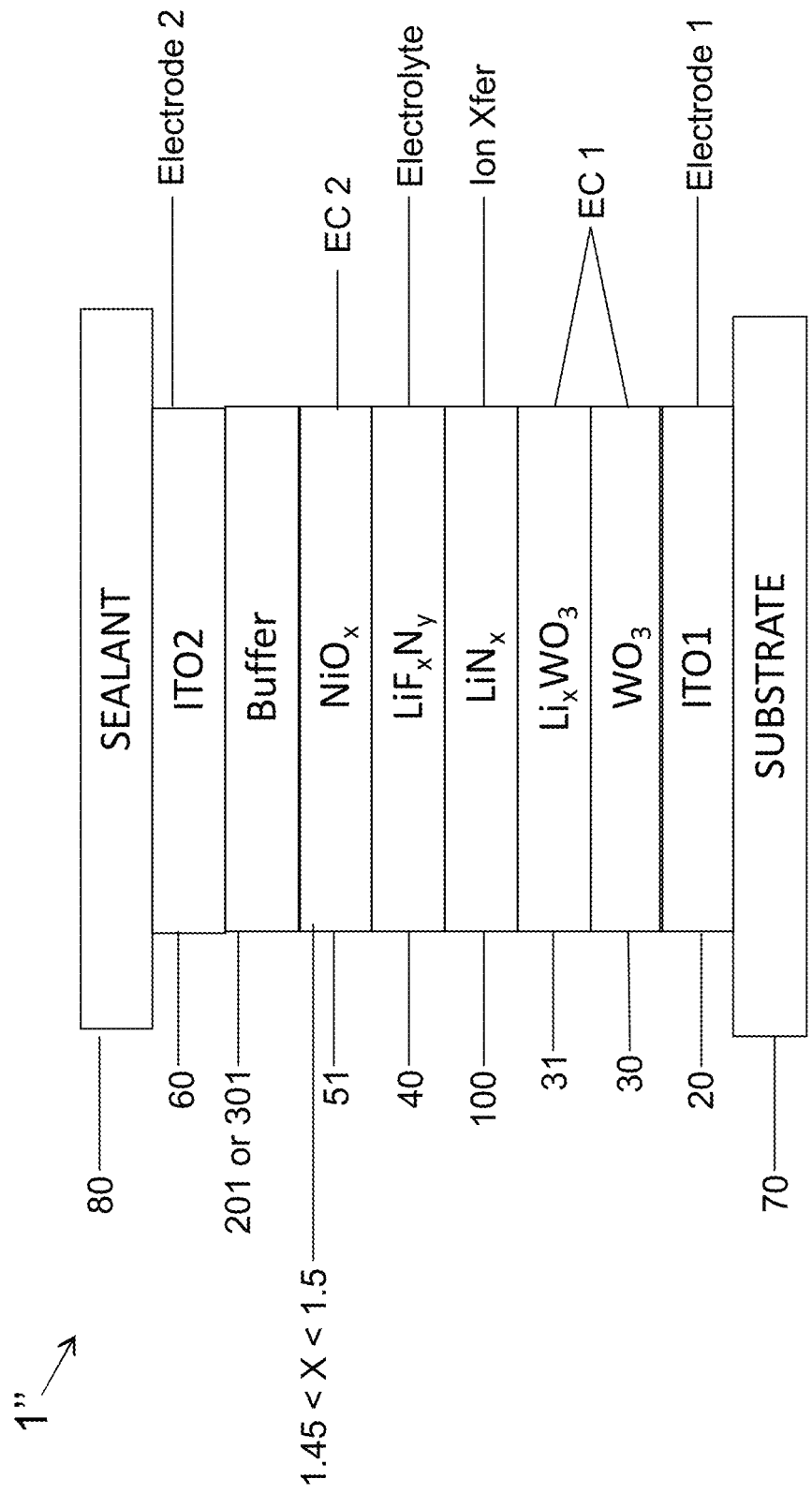
FIG. 4 is a sectional diagram of another electrochromic device contemplated herein with a buffer layer deposited between the second transparent electrode (ITO2) and electrochromic layer (EC2) with the electrochromic device being in a dark/minimum light transmitting state.

As shown, for example, in FIGS. 3A and 4, the second electrochromic layer is nickel oxide 50, 51 generally referred to as NiOx herein. Reference numerals 90 and 91 (e.g., FIGS. 3B, 5C, 5D) each respectively refer the second electrochromic layer (nickel oxide) when intercalated with lithium ions (Li$^+$) and in a clear, maximally transmissive state. In general, nickel oxide exists in two separate oxidation states namely, NiO and Ni$_2$O$_3$. By varying the deposition rate of the nickel and/or the reactive gas oxygen, the second electrochromic layer 50, 51 can exhibit different characteristics. These different characteristics form one basis for distinguishing the first embodiment (e.g., FIGS. 3A and 3B and FIG. 9) from the second embodiment (e.g., FIGS. 4-5D and FIG. 9).

Figure 9:
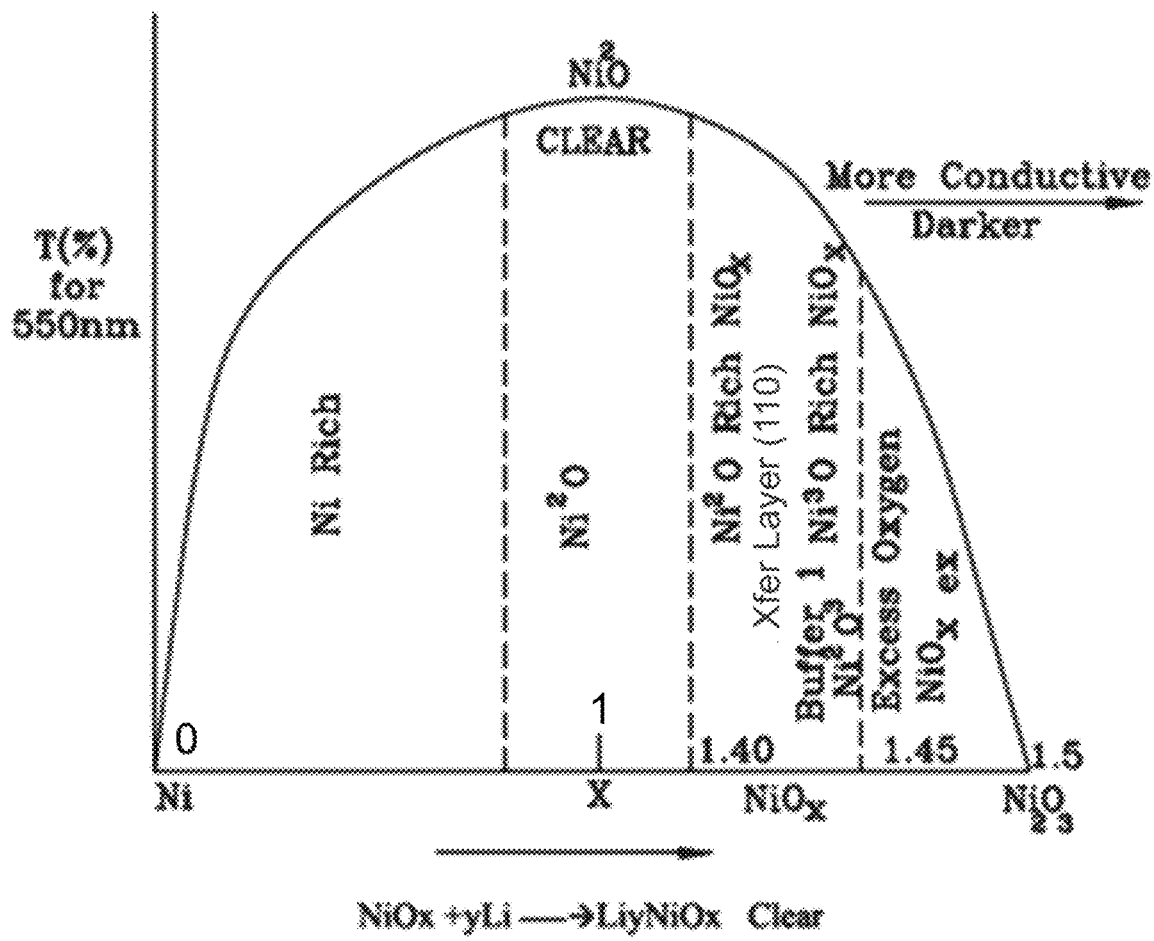
FIG. 9 is a graph depicting the percentage of light transmission of the electrochromic layer 2 (EC 2) of $NiO_x$ film as a function of the oxygen/oxidation level of x.

FIG. 9 specifically depicts transmission and conductivity of NiOx at 550 nm at various oxidation states of nickel and nickel oxide(s). For example, and as shown in FIG. 9, depicts transmission and conductive states of metallic nickel (termed "Ni Rich") and various oxidized states of nickel (e.g. Ni$_2$O to Ni$_2$O$_3$). In its first oxidation state, NiO has one nickel atom bonded to one oxygen atom and has a valence state of +2 oxide of nickel. The valence state +2 oxide of nickel is a non-absorbing material that is clear in the visible region. The second oxidation state is Ni$_2$O$_3$ in which nickel has a valence state +3. Ni$_2$O$_3$ is the highest oxidized form of Ni. Ni$_2$O$_3$ absorbs in the visible spectral region and has a dark brown color. The dark state of NiO$_x$ (i.e., Ni$_2$O$_3$) is electrically more conductive than NiO, and in some instances, is favored due to this increased conductivity. However, as further indicated in FIG. 9, when nickel oxide is in its highest oxidized form (Ni$_2$O$_3$), the second electrochromic layer disadvantageously begins releasing excess oxygen into the adjacent layer (e.g., ITO2) because nickel in this oxidation state is not stable.

Because most conventional electrochromic stacks include the second electrochromic layer positioned immediately adjacent to an electrode (i.e. a transparent electrode such as those disclosed herein), the excess oxygen from the dark state of NiO$_x$ (i.e., Ni$_2$O$_3$) would be released from the second electrochromic layer and migrate into the electrode, which renders the electrode more resistive, less conductive, and would potentially poison the overall stack thus greatly reducing lifespan and operability of the electrochromic stack/device. To avoid this problem and as discussed immediately below, the electrochromic stacks and devices disclosed herein advantageously include buffer layer(s) 110, 201, 301 positioned between the second electrochromic layer (EC2) 50 or 51) and second transparent electrode 60 (ITO2), that advantageously overcome the problems mentioned immediately above.

Buffer Layer And Interaction of Buffer Layer With EC2 and ITO2

"Buffer layer" as used herein generally refers to an electron transfer layer 110 (FIGS. 3A and 3B) or the buffer layers 201, 301 (FIGS. 4, 5A, 5B, 5C, 5D) that are respectively positioned between the disclosed second electrochromic layer and second transparent electrode disclosed herein. In certain aspects, the buffer layer 110, 201, 301 is preferably 1 to 10 nm in thickness, more preferably 2 to 6 nm in thickness, and most preferably 4 to 5 nm in thickness. As discussed above, the buffer layer generally promotes electron transfer between the second transparent electrode and second electrochromic layer while concurrently reducing or inhibiting deleterious chemical interaction(s) between the second electrochromic layer and the second electrode and/or maintaining the conductive state of the second electrode while the electrochromic device changes from the low transparency state to the high transparency state. The buffer layer specifically refers to a NiOx1 layer comprising the electron transfer layer 110 (FIGS. 3A and 3B), a metallic, oxygen depleted nickel layer 201 (FIG. 5A) (also referred to as buffer layer 1), or an oxygen depleted Indium Tin Oxide (ITO$_x$) layer 301 (FIG. 5B) (also referred to as buffer layer 2). The advantageous functions of each of these various buffer layers are specifically addressed immediately below.

Figure 10:
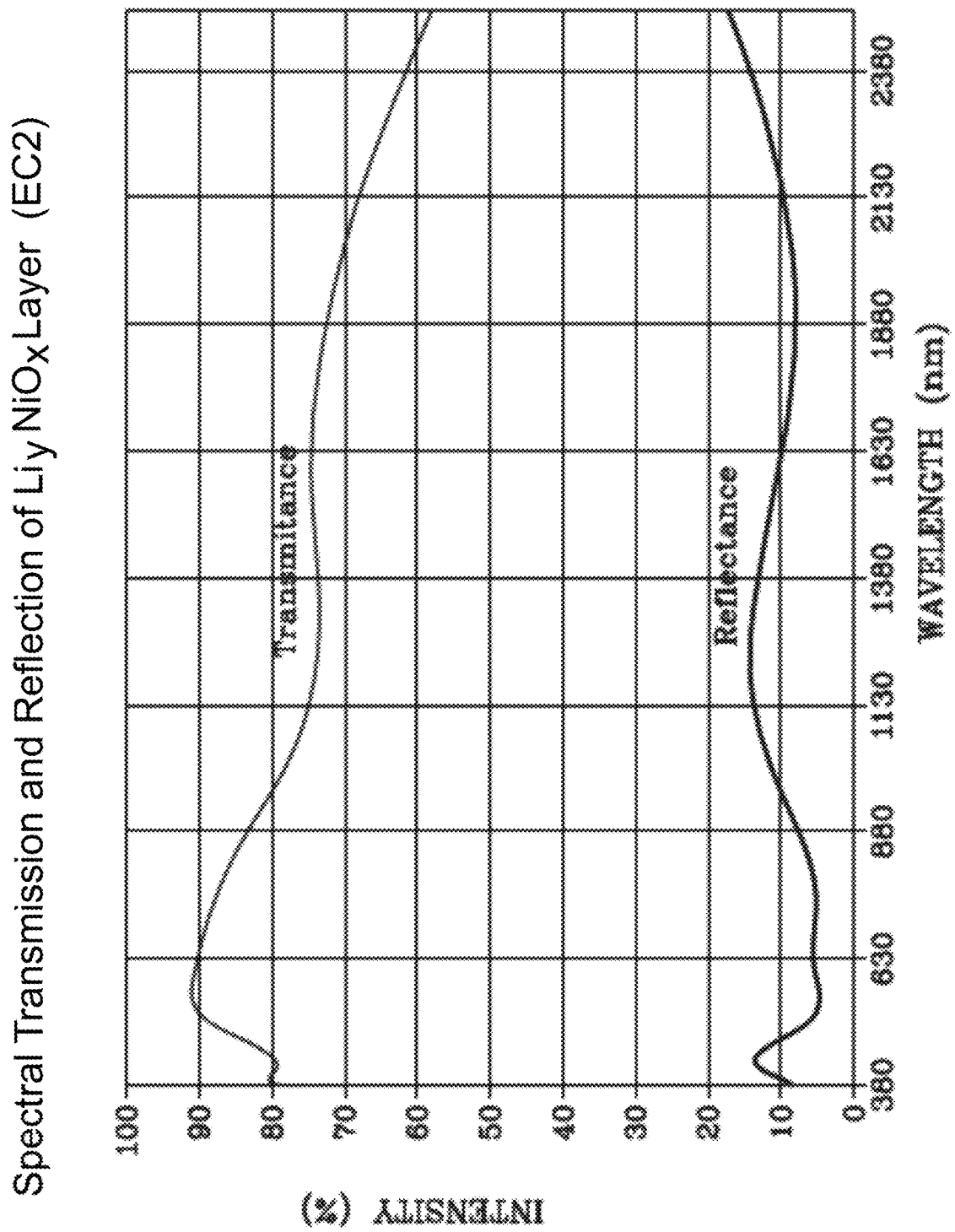
FIG. 10 is a graph depicting reflectance and transmittance plots as a function of wavelength for the EC2 layer ($Li_yNi^{+2}O_X$)
Figure 12:
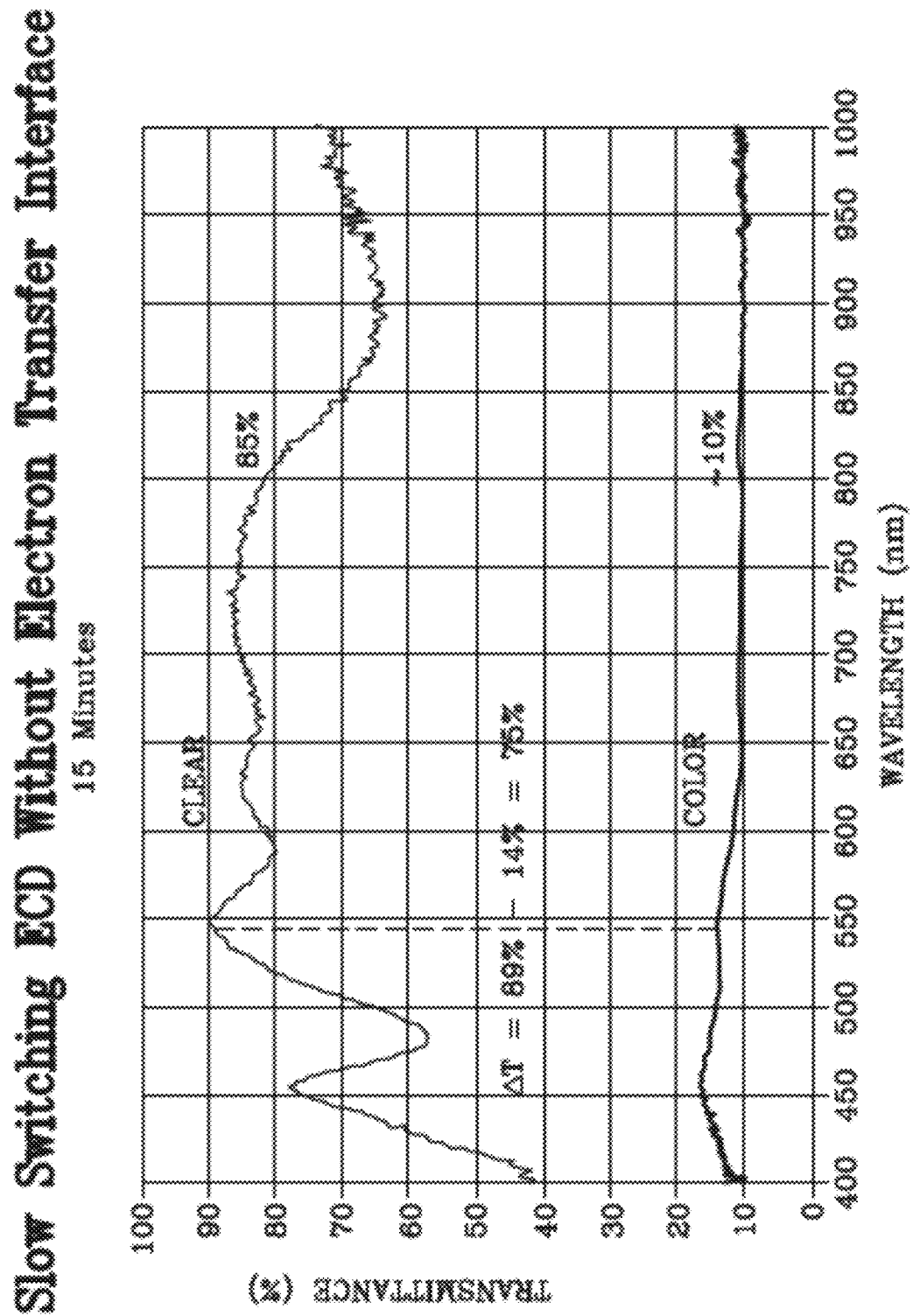
FIG. 12 is a graph depicting an electrochromic device lacking the disclosed electron transfer layer and the resulting slow switching of the electrochromic device (ECD) between a clear state and a colored state transition spectra with a 75 percent (75%) visible modulation.

FIGS. 3A and 3B disclose exemplary electrochromic stacks 1' having an electron transfer layer 110 positioned between the second electrochromic layer 50 (or 50, 90 depending on the state) and the second transparent electrode 60. In certain aspects, rapid color change (e.g., change occurring between 5 to 25 seconds, 7 to 22 seconds, or 10 to 20 seconds after application of selective electrical potential) between the colored and clear (or bleached) state is desired, and the electron transfer layer 110 (FIGS. 3A and 3B) disclosed herein achieves this desired effect while concurrently and advantageously maintaining conductivity of the overall stack. Specifically, FIG. 12 is a graph depicting an electrochromic device lacking the disclosed electron transfer layer (i.e., lacking electron transfer layer 110), which results in the slow switching (15 minutes) of an electrochromic device (ECD) between a clear state and a colored state transition spectra with a 75 percent (75%) visible modulation while FIG. 13 is a graph depicting an electrochromic device having the disclosed electron transfer layer and the fast switching (~20 seconds) of the electrochromic device (ECD) between a clear state and a colored state transition spectra with a 74 percent (74%) visible modulation through the addition of an electron transfer layer. FIGS. 3A and 3B depict an exemplary layered stack 1' having the unique combination of layers 50, 60, 110, and 80 (and 90 depending on the state of this stack). For current ECDs, conventional thoughts are that a Ni$^{+3}$,+2O$_x$ (mixed conductor) reacts with (Li+e$^-$) (or other ions such as H$^+$ or Na$^+$ if present) and all Ni$^{+3}$,+2O$_x$ will reduce to LiyNi+2O$_x$ which is believed to be the best condition (e.g., high transmittance and low reflectance as shown in FIG. 10) for conventional ECDs. However, in this reduced state, LiyNi$^{+2}$O$_x$ is dielectric (insulator) and does not adequately conduct electric current, thus leading to reduced ECD activity when all Ni$^{+3}$,+2O$_x$ is reduced to LiyNi$^{+2}$O$_x$. Optimal ECD activity requires maintaining a mixed conductor state (in the second electrochromic layer as well as the second electrode) and the ECD shown in FIGS. 3A and 3B avoids/reduces occurrence of the insulating properties of LiyNi$^{+2}$O$_x$ by including a thin NiO$_{x1}$ colored layer (110) positioned/deposited between 50 (NiOx) and 60 (ITO2) wherein $1.4<x1<1.45$ that acts as an electron transfer layer, which aids in maintaining electrochromic activity. Moreover, FIG. 3B is the same layered stack as FIG. 3A, but further depicts the chemical reactions (e.g., reference numeral 90) that occur within the stack when applying electric current thereto via power source. It should be noted that there is a close relationship between the Li loading level and buffer layer requirements of NiOx coating. Specifically, when $1<x<1.45$ and bleaching conditions of 90 (i.e., Ni$^+$2,+3O$_x$+yLi$^-$ m[LiNi$^{+2}$O$_x$] and n[Ni$^{+3}$O$_x$]) occur, Li loads and clears the film (as indicated by m[LiNi$^{+2}$O$_x$] and n[Ni$^{+3}$O$_x$] components in 90). If n (from n[Ni$^{+3}$O$_x$]) is zero, the resulting film is an insulator and no electron movement will continue to occur therein. In this condition (i.e., when n from the equation n[Ni$^{+3}$O$_x$] is zero), the electron transport layer 110 is required to maintain operability and conductivity of the system. However, in certain instances, n in the composite film is low enough with a pale color but maintains a mixed conductor condition, (e.g., n>0.05%) the electron transfer layer 110 is not needed.

In certain aspects and with regard to FIGS. 4-5D, buffer layer(s) 201 or 301 may be included in the electrochromic stack 1"$^a$ or 1"$^b$ respectively to maintain conductivity of the electrochromic stack/device while the second electrochromic layer (EC2) is in a highly oxidized state. For example and as generally depicted in FIG. 4, when the second electrochromic layer 51 (or 51, 91 depending on the state of this stack) is NiOx with $1.3<x<1.5$, the bleaching condition of 51 leads to charge loss and excess oxygen therein will then react with the second electrode (ITO2) 60 potentially poisoning the system (if no buffer layer is present). To avoid this problem, buffer layer 201 or 301 is required in the exemplary stacks depicted in FIGS. 4-5B to react with the excess oxygen thereby maintaining conductivity of the stack/system/device.

Figure 5A:
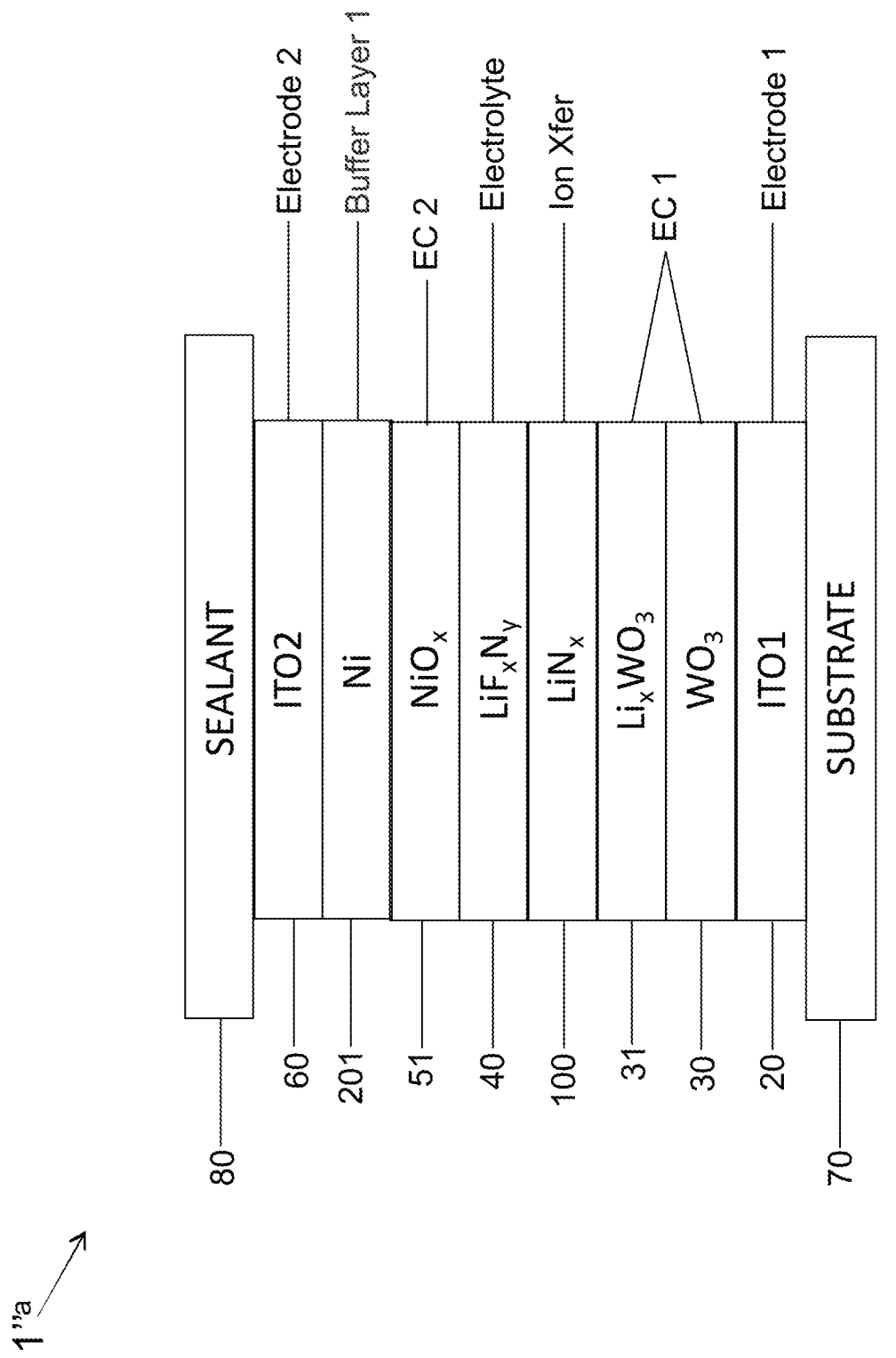
FIG. 5A is a sectional diagram of the electrochromic device of FIG. 4 specifically including a metallic Ni buffer layer deposited between the second transparent electrode (ITO2) and electrochromic layer (EC2) with the electrochromic device being in a dark/minimum light transmitting state.

FIG. 5A specifically depicts buffer layer 201, which is comprised of oxygen deficient/depleted metallic nickel. This metallic nickel layer ranges from 2 nm to 8 nm in thickness and is preferably 5 nm. For example, in certain aspects when the value of x in NiOx (51) is ~1.5, the metallic nickel layer ranges from 6 to 7 nm to bond and sequester excess oxygen released from the NiOx film. However, if the value of x in NiOx (51) is ~1.3, the metallic nickel layer ranges from 2 to 3 nm in thickness, which is sufficient to bond and sequester excess oxygen released from the NiOx film. As further depicted in FIG. 9, oxygen deficient/depleted metallic nickel is capable of accepting oxygen (i.e., becoming oxidized) and becomes clearer (more transmissive) and conductive in the visible region while being oxidized. Thus, in view of FIGS. 4, 5A, and 5C, while the disclosed electrochromic stacks/devices are in use, excess oxygen is released from the second electrochromic layer, NiOx (where $1.3<x<1.5$), and subsequently reacts with metallic Ni buffer layer 201 thereby forming NiOx to sequester the excess oxygen within the buffer layer 201 and thereby further maintaining functionality of the ECD.

In an alternative aspect and instead of including an oxygen deficient/depleted metallic nickel buffer layer 201, an oxygen deficient indium tin oxide 301 (also referred to as "ITOx" or the "ITOx buffer layer") may comprise the buffer layer positioned between the second electrochromic layer and second transparent electrode. In certain aspects, the oxygen deficient indium tin oxide 301 ranges in thickness from 5 nm to 30 nm, from 10 nm to 25 nm, or from 15 nm to 22 nm. In certain aspects, the oxygen deficient indium tin oxide 301 is 20 nm in thickness. With specific reference to FIG. 5B, the ITO$_x$ buffer layer 301 is oxygen deficient (and is brown due to oxygen deficiency as shown, for example, in FIG. 11). The ITO$_x$ buffer layer 301 functions similar oxygen deficient/depleted metallic nickel buffer layer 201 by reacting with excess oxygen released from the second electrochromic layer. Specifically, while the disclosed electrochromic stacks/devices are in use, excess oxygen is released from the second electrochromic layer, NiOx (where 1.3<x<1.5), and subsequently reacts with and is sequestered within the oxygen deficient $ITO_x$ buffer layer 301, which advantageously results in the $ITO_x$ buffer layer 301 becoming more conductive and changing its color from dark brown (oxygen deficient state) to a clear state while concurrently maintaining ECD functionality by preventing poisoning of the second transparent electrode 60. FIG. 5D shows an additionally contemplated arrangement having sealant 81 positioned between substrate 70 and the first transparent electrode 20.

Bus Bar

The function of the transparent conductive layers 20, 60 is to spread an electric potential provided by a voltage source over surfaces of the electrochromic stack to interior regions of the stack, with very little ohmic potential drop. The electric potential is transferred to the conductive layers through electrical connections to the transparent conductive layers 20, 60. As shown, for example, in FIGS. 2A and 2B in view of FIGS. 1A and 1B, bus bars 21, 61, one in contact with a first conductive layer 20 and one in contact with second conductive layer 61, provide the electric connection between the voltage source(s) 22, 62 and the first and second transparent conductive layers 20, 60.

The bus bar 61 connects the second transparent conductive electrode 60 to the external power source 62. The subsequent layers including the buffer layer 110, 201, 301 the second electrochromic layer 50, the electrolyte 40, the first electrolyte layer 30 and the first transparent conductive electrode 20 are all formed sequentially by a vacuum deposition process. Bus bar 21 connects the first transparent conductive electrode 20 to the external power source 22. The sealant 80 cooperates with the substrate 70 to encapsulate the electrochromic device 10. More specifically and for electrochromic devices with the buffer layer thicknesses and oxidation level(s) described above, a DC power supply is connected to the bus bars 21, 61 of the ECD system. For coloring of the system, ITO1 is connected to the negative pole and ITO2 to the positive pole of the power supply. Coloring voltage ranges from 1.5V to 3.0V and the bleaching voltage ranges from 0.5V to 2.0V, which activates the system. In certain aspects, the electrochromic devices disclosed herein are operable at, for example, 2.2V for colored/dark state(s) and at 1.2V for clear/bleached state(s); are more preferably operable at 1.8V for colored/dark state(s) and 0.8V for clear/bleached state(s), and most preferably at 1.6V for colored/dark state(s) and 0.6V for clear/bleached state(s)—with better electrochromic device longevity and lifespan being obtained at the lower voltage(s) mention above. If we give only one color/bleach voltage pairs above this range we lost the case. Any resistive element in the system, such as contact resistance or resistive interfaces requires higher voltages application to activate ECD. Coloring and bleaching voltages for reasonable resistance level(s) are 2V and IV respectively.

WORKING EXAMPLES

Example 1

ITO Coating

For the electrochromic devices disclosed herein, Indium Tin Oxide (ITO) was used as Transparent Conductive Oxide (TCO) (also referred to herein as "first" and/or "second electrodes" and/or "ITO1" and "ITO2" in the Figures). Indium Tin Oxide (ITO) is a commercially available composite material of $In_2O_3$ and $SnO_2$. The Transparent Conductive Oxide (TCO) is a composite formed from 90% $In_2O_3$ and 10% $SnO_2$. An ion assisted e-beam deposition process was used to deposit the Indium Tin Oxide (ITO) coating onto a transparent substrate (or other layers of the ECD as depicted in FIGS. 2A and 2B). The Transparent Conductive Oxide (TCO) coating are deposited on either flat or curved substrates, which include glass substrate(s) or plastic substrates such as polyethylene terephthalate (PET), biaxially-oriented polyethylene terephthalate (BoPET)(Mylar or Melinex), or Polycarbonate substrates.

The Indium Tin Oxide (ITO) coatings were formed by the ion assisted e-beam deposition technique on room temperature substrates. When using an ion gun to form an Indium Tin Oxide (ITO) coating in an oxygen deficient atmosphere, the resulting Indium Tin Oxide (ITO) coating has a brown color and is highly resistive as shown in FIG. 6, which is disfavored. Thus, during the deposition process, a mixture of ionized argon (~5% to 10%) and oxygen (~90% to ~95%) is directed through the ion gun to the coated area to make the coating more transparent and reduce the sheet resistance of the deposited Indium Tin Oxide (ITO) coating.

A higher level in ion energy of the ion gun, results in a higher the degree of crystallinity in the Indium Tin Oxide (ITO) coating. The higher the degree of crystal structure of the coating results in a lower the sheet resistance of the Indium Tin Oxide (ITO) coating. In one example, Indium Tin Oxide (ITO) coating was formed/deposited on a polymer substrate with the ion energy being optimized to avoid excess heating to damage the polymer substrate while depositing the Indium Tin Oxide (ITO) coating thereon.

FIG. 6 is a dual graph illustrating both the sheet resistance and the transparency of the resulting Indium Tin Oxide (ITO) coatings as a function of the oxygen level during deposition. A low level of oxygen results in a dark resistive coatings while high level of oxygen forms very clear, fully oxidized, but resistive coatings. The dual graph illustrates the critical oxidation range in the process region where minimum sheet resistance $R_{(min)}$ and clear Indium Tin Oxide (ITO) coatings are deposited. The ionization energy of ion gun, the oxygen/argon flow rate through ion gun, deposition rate of Indium Tin Oxide (ITO) are the main process parameters to achieve optimal Indium Tin Oxide (ITO) coatings.

Sheet Resistance Vs. Oxygen and Transmittance Vs. Oxygen During Deposition

Indium Tin Oxide (ITO) coatings deposited on polymer substrates are poorly crystalline and mostly amorphous in structure. Refractive index is around 1.9, sheet resistance is ~20 Ohm/sqr, and corresponding resistivity is 0.4 m Ohm cm. Resistance of the Indium Tin Oxide (ITO) coating decreases with increasing coating thickness. Resistivity of a highly crystalline Indium Tin Oxide (ITO) coating deposited on heated glass is around 0.1 m Ohm m.

Example 2

Electrochromic Layer (EC1)

Deposition of $WO_3$ Films $WO_3$ films were deposited by an e-beam vacuum deposition technique using preformed $WO_3$ tablets. These tablets were prepared by using wet $WO_3$ powder pressed into a tablet form and heated to approximately 500° C. for 10 hours.

$WO_3$ films were deposited in a vacuum on various substrates previously coated with an Indium Tin Oxide (ITO) coating/layer. When background pressure reaches $10^{-6}$ Torr, $WO_3$ films were deposited 1-2 nm/sec deposition rate without using any special gas (e.g., without using oxygen).

Higher deposition rates of $WO_3$ on the order of 1-2 nm/s are used to deposit desired porous stress free nanostructured oxide for easy ion intercalation-extraction (i.e., lithium ion intercalation and extraction/migration depending on the electrical potential applied to the electrochromic device). The refractive index of $WO_3$ films are 1.7-2.2 depending on the film porosity. The higher the deposition rate of the $WO_3$, the higher the porosity of the $WO_3$ resulting film. As an intercalation material, the $WO_3$ films are deposited with refractive index of 1.9-2.0. The film thickness is controlled by the deposition time.

The $WO_3$ coating/layer is a color forming element of an electrochromic device. The thicker the $WO_3$ film/layer, the deeper the color obtains upon ion intercalation, e.g., a 50 nm film provides a lighter color while a 700 nm film provides deeper color e.g., 4-5%. $WO_3$ is preferred because of its very good dielectric material (having a dielectric constant of 80 in the 1 KHz region).

The electrochromic material (e.g., $WO_3$) must be mixed with a conductor in order to conduct both ions (Li, Na, H and such) and electrons. Slightly reduced $WO_3$ (very slightly oxygen deficient film) provides the necessary mixed conductor performance. For cathodic coloring, electrochromic coloring occurs by:

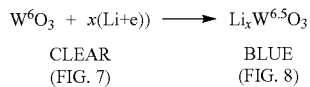

$$W^6O_3 + x(Li+e)) \longrightarrow Li_xW^{6.5}O_3$$
CLEAR      BLUE
(FIG. 7)     (FIG. 8)

$0.22 < x$

As shown in FIG. 7, the $WO_3$ film(s)/layer(s) is very transparent in the visible region, but slightly absorbing at 800-900 nm where a broad absorbing band is located. These films are a fast intercalating and de-intercalating form of $WO_3$ (e.g., intercalating and de-intercalating speeds are ~0.01 Å/sec) and maintain a mixed conductor performance even in the clear condition thereby maintaining conductivity of the electrochromic device and avoiding an insulating condition.

FIG. 7 depicts spectral transmittance (T %) of a 500 nm thick $WO_3$ film deposited on a glass substrate. The 500 nm thick $WO_3$ is very clear with no absorption in the visible region (380 nm to 750 nm), and has a slight reduction of transmittance with increasing wavelengths, which indicates a slight oxygen deficiency of the film, e.g., transmission maxima is ~90% at around 500 nm, goes down to 84% at ~900 nm.

Example 3

Ion Transfer Layer

Lithium Loading, Intercalation

Next, an ion transfer layer ($LiN_x$) is deposited over the $WO_3$ (EC1) layer to form a lithium intercalated $WO_3$ layer ($Li_xWO_3$). FIG. 7 demonstrates that the deposited $WO_3$ has no color in the visible region but Li intercalated $Li_xWO_3$ has a strong blue color (evidenced by low transmittance) shown in FIG. 8. The Li intercalation process can be applied on either one of the electrochromic (EC) layers by direct vacuum deposition of metallic Li (in, for example, a nitrogen atmosphere which forms a LiN layer on the $WO_3$ layer). Upon deposition of the metallic Li, Li migrates into the electrochromic (EC) layer by electrochemical potential assisted by diffusion force(s). If the electrochromic (EC) layer is a cathodically coloring material like $WO_3$, deeper color(s) form during this deposition.

A calibrated optical monitor was used to indicate the amount of intercalation. A post deposition titration method accompanied with optical transmission measurements can also be used to determine the amount of Li intercalated into the electrochromic (EC) layer. In inert atmosphere glow box titration experiments, 1 Mole of $LiClO_4$ salt dissolved in a polycarbonate solution was used as an electrolyte with $Li_xWO_3$ as an anode and with $WO_3$ as a cathode. Li was titrated from $Li_xWO_3$ into unloaded $WO_3$ film. This titration experiment yields the x fraction of Li attached per $WO_3$ molecule.

Metal pieces of Li are used for deposition. Li violently reacts with oxygen and water so the Li is preserved in the glow box. A Li loaded e-beam crucible kept in the glow box was immediately transferred in the vacuum chamber and chamber was pumped down. Li melts at low temperatures associate with a purple glow appearing around crucible indicating the Li is ready for deposition.

Since $10^{-6}$ Torr background pressure in the chamber still contains enough reactive elements, to form lithium oxide, and lithium hydroxide on electrochromic (EC) surface that are not ion conductor(s), ionized nitrogen is directed to the coating surface to keep the coating surface clean. Ionized nitrogen allows only a very thin layer to form on the self-assembled $LiN_3$. Typically, a flow rate of 20-50 Sccm of nitrogen and a 3-4 KV/cm plasma field is used to form appropriate $LiN_3$ interface layer. Through this $LiN_3$ ion transfer interface Li intercalates into electrochromic (EC) layer. Another very critical deposition process parameter is the deposition rate of Li deposition. Li deposition rate must be very close to Li diffusion rate into electrochromic (EC) layer. A faster deposition leads to high density Li region that degrades the intercalation region on electrochromic (EC) layer. A slower deposition leads to increase $LiN_3$ interface film thickness that is not desirable due to adverse effects on electrochromic device (ECD) conductivity. Any poorly functioning layer or interface in the electrochromic device (ECD) leads to very poorly functioning and a very slow responding coloring-clearing electrochromic device (ECD). For $WO_3$ film, an optimum Li deposition rate is 0.15-0.2 nm/sec. with a Li film thickness of 5-40 nm depending on the desired modulation of electrochromic device (ECD). For NiOx (EC2), a slightly higher deposition rate of 0.2-0.25 nm/sec was used. The loading level x of $Li_xWO_3$ film is x=0.2-0.25 and y of LiyNiOx is y=0.4-0.6.

Example 4

Electrolyte

Next, the electrolyte layer is formed on the ion transfer layer. The electrolyte/electrolyte layer is a solid inorganic nanocomposite film of lithium fluoride and lithium nitride, $LiF_x$—LiNy where x is approximately 75%-95% and y is approximately 25%-5%. $LiF_xNy$ has a glass-like transparency and low refractive index, n~1.5, with a dielectric constant of 6-8 and breakdown field of ~5 MV. LiF$_x$Ny is an excellent Li conductor and excellent electron insulator.

In the e-beam deposition process, pure LiF is used as a starting deposition material. The LiF is deposited on Li loaded EC (blue Li$_x$WO$_3$ or clear Li$_y$NiO$_x$) without breaking a vacuum. During deposition, ionized nitrogen is directed to the coating area in the vicinity of the coating surface. When LiF is used without nitrogen (or a nitriding) component, the coating is not Li ion conductor, but when used with a nitrogen or nitriding component, this results in LiF$_x$N$_y$, which is conductive and desired for the disclosed electrochromic devices (ECDs). This nanocomposite form of LiF and LiN$_3$ is a very good Li ion conductor. LiF is not an electrolyte but a low refractive index, n~1.4, transparent antireflective coating material. LiF$_x$N$_y$ is a solid ion conductor including the conduction of Li, Na, H, and other small ions as previously reported in U.S. Pat. No. 7,265,891 (incorporated by reference herein in its entirety). A deposition rate of 0.1-0.3 nm/sec is used for appropriate composition. The film thickness of 50 nm to 10 microns (μm) varies depending on application and type of substrate, e.g., for flat glass it is thinner, but rougher and curved surfaces thicker electrolyte preferred.

Example 5

Electrochromic Layer (EC2)

Next, the second electrochromic layer (EC2) is formed/deposited on the electrolyte layer. The second electrochromic layer (EC2) is a nickel oxide (generally referred to as "NiOx"). NiOx has two oxidation states. In its first oxidation state, NiO has one nickel atom bonded one oxygen atom and has a valence state +2 oxide of nickel. The valence state +2 oxide of nickel is a non-absorbing material that is clear in the visible region. The second oxidation state is Ni$_2$O$_3$ in which nickel has a valence state +3. Ni$_2$O$_3$ is the highest oxidized form of Ni. Ni$_2$O$_3$ absorbs in the visible spectral region and has a dark brown color. The dark state of NiO$_x$ is electrically more conductive than NiO.

NiO$_x$ films are deposited by an e-beam evaporation process using metallic nickel and exposing metallic nickel vapor to ionized oxygen plasma at the coating surface (i.e., on the electrolyte mentioned in Example 4). Oxidation of metallic nickel occurs when the metallic nickel is ionized and reacts with oxygen (i.e., ionized oxygen plasma) directed at the coating surface (i.e., on the electrolyte mentioned in Example 4). Oxidation level and the ratio of NiO and Ni$_2$O$_3$, which comprises the NiO$_x$ composite oxide, are selectively controlled by the deposition parameters of:

1. Background pressure during deposition (2×10$^{-4}$ Torr)
2. Sccm oxygen used in the reactive gas plasma (100 Sccm)
3. Plasma energy (2000V/cm field)
4. Deposition rate of Nickel is 0.3-0.7 nm/sec; slower the deposition creates the darker film (Ni$_2$O$_3$ component rich). Buffer 1 and transfer layer FIG. 9 shows how increasing reactive oxygen level(s) in the NiOx film/layer effects the transmission level of the second electrochromic layer (EC2). Films/Layers formed under low oxygen level(s) are metal rich oxides of nickel e.g., Ni—NiO composites. The resulting electrochromic layer (EC2) has a metallic luster and dark color. Increasing oxygen during deposition results in clearer films having more NiO component(s). A continued increase of oxygen during deposition results in a clear NiO film having maximum transmission. However, with excess oxygen, transmission decreases and the films are NiO—Ni$_2$O$_3$ composites having a pale brown to a deeper brown color, which is the desired layer for the second electrochromic layer (EC2).

Dark films of the second electrochromic layer (EC2) can be cleared/become more transmissive upon Li ion intercalation. Specifically, brown NiOx becomes clear Li$_y$NiO$_x$ upon intercalation with Li ion(s) into the second electrochromic layer (EC2) so that the nickel oxide valence of 3 (brown oxides of nickel) becomes reduced to a valence of 2 resulting in a clear nickel oxide, which is best described as follows:

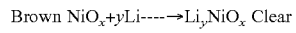

Brown NiO$_x$+yLi----→Li$_y$NiO$_x$ Clear

As shown in FIG. 3A, the NiOx 1 electron transfer layer is needed in this condition. FIG. 10 shows spectral transmission and reflection of 120 nm thick Li loaded NiOx (Li0.5NiOx) film deposited on ITO coated glass. Clear LiyNiOx has a low refractive index, n~1.5, and film on glass has 92% transmission as shown in FIG. 10. The film is extremely clear having a transmission of (~90%) and an anti-reflective ((5%) in the visible region.

A continued increase in the oxidation level of NiO$_x$ films greater than the EC2 region nickel oxide films become instable. Deeper brown color films, e.g., ~200 nm thick deep brown NiO$_x$ films having less transmission than 50%, are not stable. Deeper brown color films have excess oxygen to the extent that the excess oxygen NiOx cannot be reduced by Li ion intercalation.

When NiO$_x$ (EC2) having excess oxygen directly contacts an Indium Tin Oxide (ITO) or any other Transparent Conductive Oxide (TCO) film of the electrochromic device (ECD), the excess oxygen from NiO$_x$ migrates into the Transparent Conductive Oxide (TCO) and poisons the Transparent Conductive Oxide (TCO) by increasing the sheet resistance thereof. Under these conditions, at least one of the buffer layer(s) shown in FIGS. 4, 5A, 5B, 5C, and/or 5D is needed to prevent poisoning of the ITO/TCO and to further maintain conductivity/operability of the electrochromic device (ECD).

Buffer Layer 1

FIGS. 5A and 5C

FIG. 9 depicts the nickel oxide films deposited in this excess oxygen region. As alluded to above, a buffer layer is needed to accept and sequester excess oxygen from the second electrochromic layer (formed of nickel oxide) to maintain the top electrode (ITO2) performance by preventing excess oxygen from migrating therein and disrupting operability of the electrochromic device (ECD). FIGS. 5A and 5C show Ni buffer layer deposited between EC2 and ITO2. FIG. 11 further explains how NiOx, when in an excess oxygen condition of 145<x<1.5, reacts with ITO2 layer by releasing excess oxygen into ITO2 resulting in increased resistance of ITO2.

To prevent the above mentioned phenomena from occurring, a ~2-5 nm thick Ni buffer layer is deposited on NiOx (EC2) and absorbs excess oxygen from NiOx (EC2) to prevent excess oxygen from migrating into the ITO2 layer and poisoning the system/electrochromic device (ECD). More specifically and as a first example of a buffer layer, a thin metallic layer of Ni is deposited on top of NiO$_x$ with an Indium Tin Oxide (ITO) film deposited on top of thin metallic layer of Ni. The thickness of the metallic Ni film is adjusted to absorb any excess oxygen releasing from NiO$^x$.

As shown in FIG. 9, metallic Ni typically has a low transmission but clears and becomes more transmissive upon reacting with and sequestering excess oxygen released from NiOx while characteristics of ITO2 (e.g., electrode resistance) remain constant even as the metallic Ni film binds and sequesters excess oxygen from EC2 (NiOx).

A series of test depositions can be used for calibration of necessary thickness of the metallic Ni buffer. The thicker and darker NiOx films (EC2) have more oxygen therein which can be released, and therefore, as EC2 thickness increases, thickness of the metallic Ni buffer layer also increases. The metallic Ni buffer layer thickness ranges from 2 to 6 nm in thickness.

Buffer Layer 2

Figure 5B:
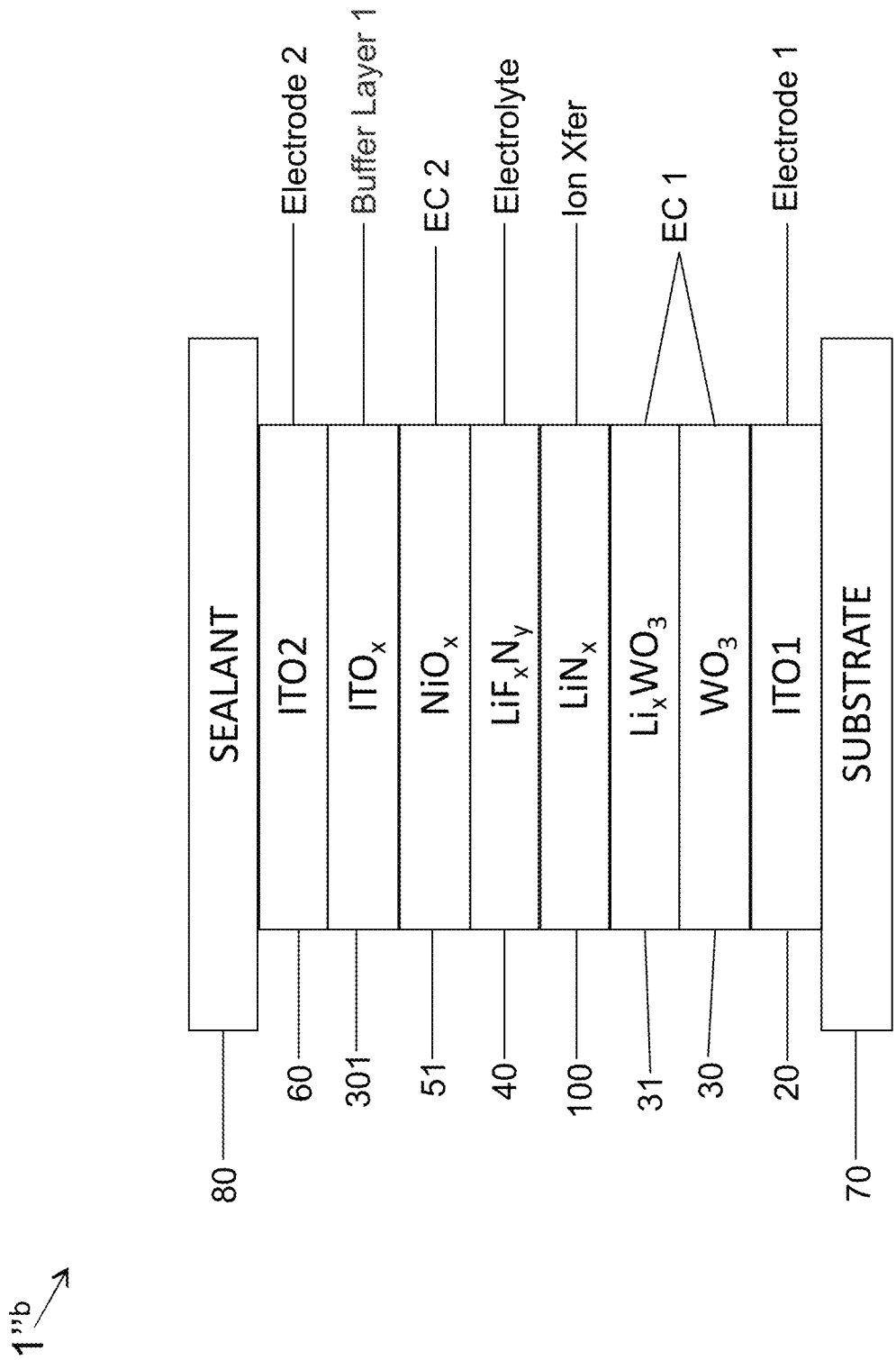
FIG. 5B is a sectional diagram of the electrochromic device of FIG. 4 specifically including an oxygen deficient ITOx buffer layer deposited between the second transparent electrode (ITO2) and electrochromic layer (EC2) with the electrochromic device being in a dark/minimum light transmitting state.
Figure 5C:
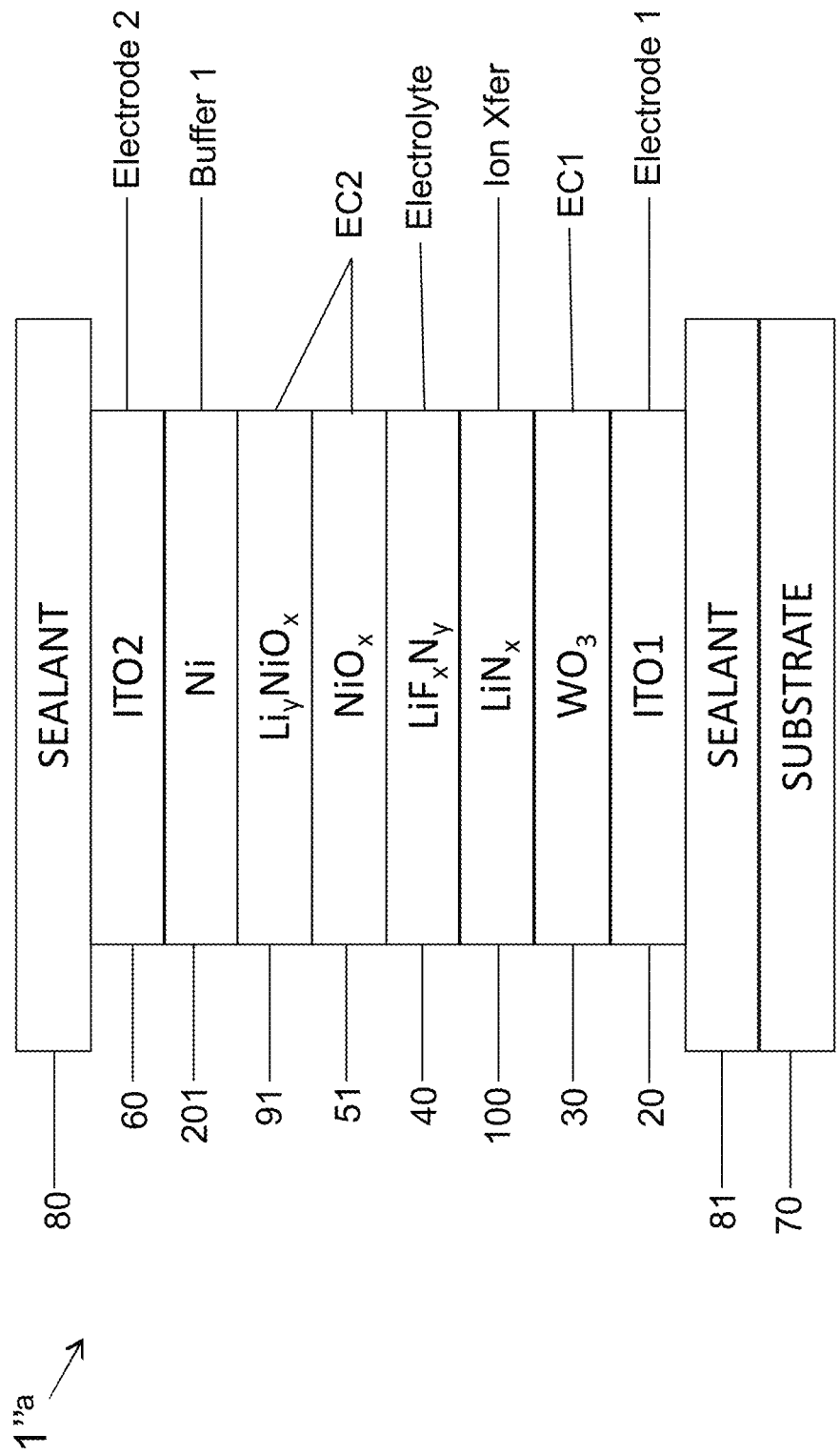
FIG. 5C is a sectional diagram of sectional diagram of an electrochromic device that is substantially similar to that depicted in FIG. 5A but further includes an optional sealant layer deposited between the substrate and first transparent electrode (ITO1) and further depicts the electrochromic device in a clear/maximum light transmitting state.
Figure 5D:
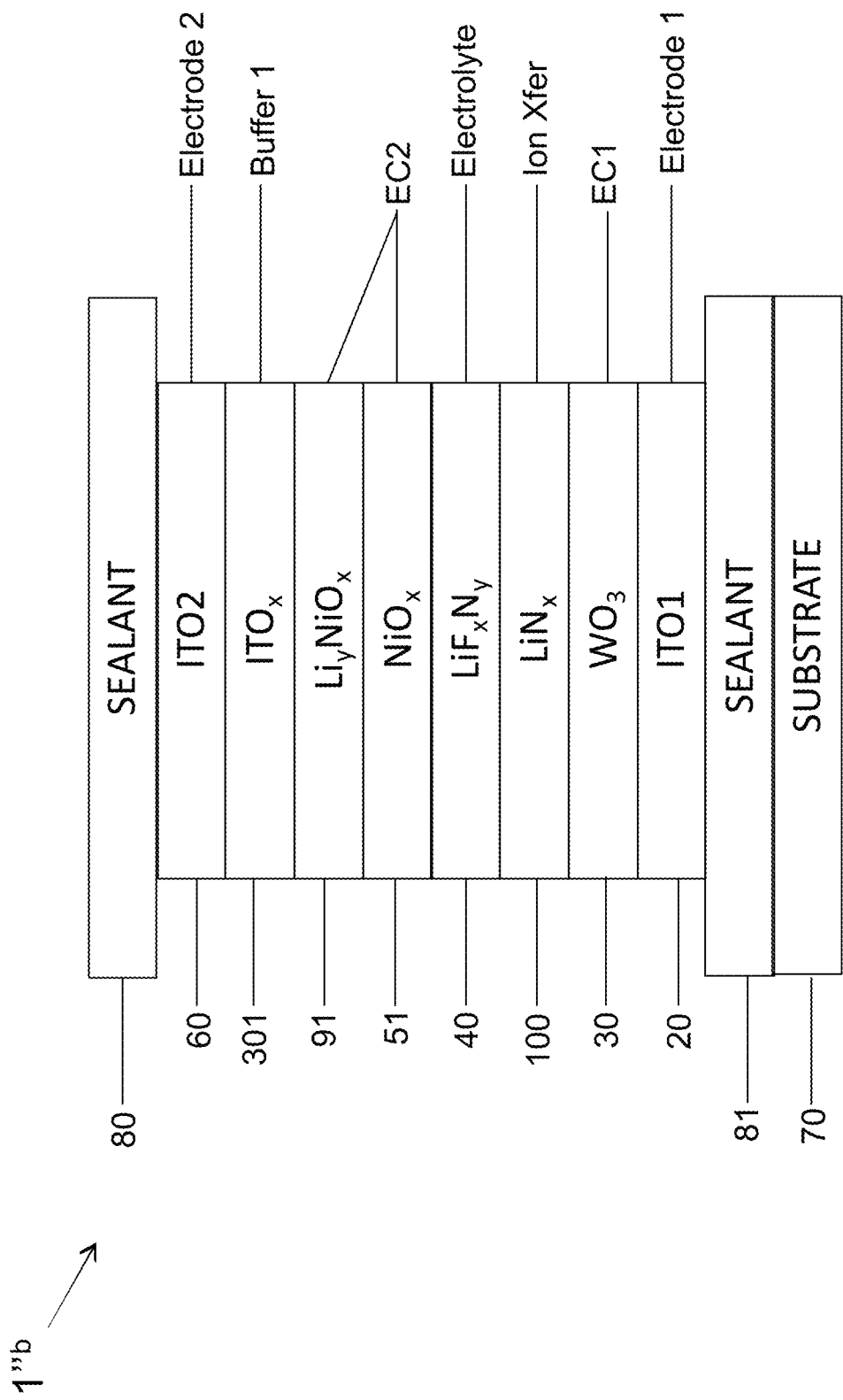
FIG. 5D is a sectional diagram of sectional diagram of an electrochromic device that is substantially similar to that depicted in FIG. 5B but further includes an optional sealant layer deposited between the substrate and first transparent electrode (ITO1) and further depicts the electrochromic device in a clear/maximum light transmitting state.

FIGS. 5B and 5D

A second example of a buffer layer is an oxygen deficient Indium Tin Oxide ITO ($ITO_x$) film. The oxygen deficient Indium Tin Oxide ($ITO_x$) buffer layer film is brown and resistive. Similar to the metallic Ni buffer layer mentioned above, the oxygen deficient Indium Tin Oxide ($ITO_x$) buffer layer can react with and sequester excess oxygen released from $NiO_x$ (EC2). When the oxygen deficient $ITO_x$ buffer layer reacts with and sequesters excess oxygen released from $NiO_x$, resistance of this buffer layer decreases. Furthermore, when the oxygen deficient Indium Tin Oxide ($ITO_x$) oxidizes to Indium Tin Oxide (ITO), the Indium Tin Oxide (ITO) becomes clearer and more conductive while concurrently maintaining the conductive state of the ITO2. A series of test depositions can be used to calibrate thickness and oxidation level on the oxygen deficient Indium Tin Oxide ($ITO_x$) buffer. In one example, the oxygen deficient Indium Tin Oxide ($ITO_x$) layer ranges from 15 to 25 nm thick.

Inclusion or Omission of Electron Transport Layer

FIG. 12 shows a color modulation ΔT %=75% to 76% of an exemplary ECD that omits an electron transport layer as disclosed herein. The ECD, which omits the electron transport layer, reaches a deep color state within 15 minutes, which indicates that color .switching speed (i.e., clearing from a colored state to a clear state) is slower due to the poor electron conductivity of the material used for electron transfer of the dark $Ni^{+3}O_x$ layer 2-5 nm thick. However, as shown in FIGS. 3A and 13, color switching is drastically improved and occurs in the visible region within 20 seconds when an Electron Transfer Layer is included.

What is claims is:

1. An electrochromic device included within another device, the electrochromic device comprising:
    a first transparent electrode comprised of a conductive metal oxide, the first transparent electrode is configured to selectively gain and/or lose electrons upon selective application of electrical potential to the electrochromic device;
    a first electrochromic layer formed on and in electrical contact with the first transparent electrode, the first electrochromic layer is configured to reversibly change from a colored state to a transparent state upon loss of a first amount of ions and electrons from the first electrochromic layer upon selective application of electrical potential to the electrochromic device;
    an electrolyte layer formed on the first electrochromic layer and positioned between the first electrochromic layer and a second electrochromic layer, the electrolyte layer is configured to selectively transfer ions from the first electrochromic layer to the second electrochromic layer upon selective application of electrical potential between the first electrode and a second transparent electrode to change the electrochromic device from a low transparency state of approximately 10-20% transmittance in the visible region to a high transparency state of approximately 75% to 95% transmittance in the visible region with at least a 70% difference in transmittance between the low and high transmittance states;
    the second electrochromic layer formed on the electrolyte layer, the second electrochromic layer comprises an electrochromic metal oxide and is configured to reversibly change from a colored state to a transparent state upon gaining an amount of ion-electron pairs that coincides with the loss of the first amount of ion-electron pair from the first electrochromic layer upon selective application of electrical potential to the electrochromic device;
    a buffer layer formed on the second electrochromic layer and positioned between the second electrochromic layer and the second transparent electrode that is configured to maintain conductivity and stability of the electrochromic device while in use; and
    the second transparent electrode formed on the buffer layer and in electrical contact with the second electrochromic layer, the second transparent electrode comprises the same conductive metal oxide as the first transparent electrode and is configured to selectively gain and/or lose electrons upon application of selective electrical potential to the electrochromic device, wherein:
    the buffer layer promotes electron transfer between the second transparent electrode and second electrochromic layer while concurrently reducing or inhibiting deleterious chemical interaction between the second electrochromic layer and the second electrode and/or maintaining the conductive state of the second electrode while the electrochromic device changes from the low transparency state to the high transparency state, and
    the another device comprises a mirror, an optical filter, or photovoltaic device.

2. The electrochromic device of claim 1, wherein the electrochromic device is configured to change from the low transparency state having a gray color to the high transparency state that is substantially colorless and vice versa within 20 seconds of applying the selective electrical potential to the electrochromic device.

3. The electrochromic device of claim 1, wherein the buffer layer is configured to react with and sequester excess oxygen from the second electrochromic layer thereby limiting and/or inhibiting interaction of excess oxygen from the second electrochromic layer with the second electrode to maintain a conductive state of the second electrode while the electrochromic device changes from the low transparency state to the high transparency state during application of selective electrical potential to the electrochromic device.

4. The electrochromic device of claim 1, wherein the buffer layer comprises at least one of:
    a $NiO_{x1}$ layer configured to transfer electrons between the second electrode and second electrochromic layer,
    a metallic nickel (Ni) layer configured to react with and sequester excess oxygen from the second electrochromic layer to maintain a conductive state of the second electrode while the electrochromic device changes from the low transparency state to the high transparency state, and/or an oxygen deficient $ITO_X$ layer configured to react with and sequester excess oxygen from the second electrochromic layer to maintain a conductive state of the second electrode while the electrochromic device changes from the low transparency state to the high transparency state.

5. The electrochromic device of claim 4, wherein the buffer layer is $NiO_{x1}$ layer where $x_1$ is $1.4<x_1<1.45$ and the second electrochromic layer is NiOx where x is $1.0<x<1.45$.

6. The electrochromic device of claim 1, wherein the second electrochromic layer comprises nickel oxide (NiOx) in which x of NiOx is $1.3<x<1.5$ and the buffer layer comprises one of a metallic nickel (Ni) layer configured to react with and sequester excess oxygen from the second electrochromic layer to maintain a conductive state of the second electrode while the electrochromic device changes from the low transparency state to the high transparency state or an oxygen deficient ITOx layer configured to react with and sequester excess oxygen from the second electrochromic layer to maintain a conductive state of the second electrode while the electrochromic device changes from the low transparency state to the high transparency state.

7. The electrochromic device of claim 1, wherein the first and second transparent electrodes each comprise a transparent conductive oxide (TCO).

8. The electrochromic device of claim 7, wherein the first and second transparent electrodes are each selected from the group consisting of ITO, $SnO_2F$, ZAO (Al doped ZnO) fluorine doped tin, fluorine doped ZnO.

9. The electrochromic device of claim 1, wherein the first and second transparent electrodes each comprise an indium tin oxide (ITO) layer.

10. The electrochromic device of claim 1, wherein the first electrochromic layer is a lithium tungsten oxide ($Li_xWO_3$) layer in which $x<0.2$ to maintain conductivity of the electrochromic device and prevent the first transparent electrode from becoming resistive.

11. The electrochromic device of claim 1, wherein the electrolyte layer is a lithium fluoro nitride layer ($LiF_xN_y$) and the electrochromic device further comprises an LiNx ion transfer layer positioned between the first electrochromic layer and the electrolyte layer that facilitates lithium ion transport between the electrolyte and first electrochromic layers upon application of selective electrical potential to the electrochromic device.

12. The electrochromic device of claim 11, wherein lithium (Li) ions intercalate and de-intercalate between the first and second electrochromic layers upon the application of a reverse electrical potential to facilitate the electrochromic device changing from the low transparency state at a voltage ranging from 1.5 V to 3.0 V with the first transparent electrode having a negative polarity to the high transparency state at a voltage ranging from 0.5V to 2.0 V with the first transparent electrode having a positive polarity.

13. The electrochromic device of claim 1, wherein said ions are lithium (Li) ions.

14. The electrochromic device of claim 1, wherein said second electrochromic layer comprises a nickel oxide (NiOx).

15. The electrochromic device of claim 14, wherein x of NiOx is $1.0<x<1.45$.

16. The electrochromic device of claim 1, further comprising a substrate having either the first or the second electrode is formed thereon.

17. The electrochromic device of claim 16, wherein the substrate is either planar or curved and is formed of at least one of glass, polyethylene terephthalate (PET), polycarbonate, or a mirror.

18. The electrochromic device of claim 17, wherein a sealant is deposited on an outermost face or an innermost face of the substrate.

19. The electrochromic device of claim 18, wherein the sealant is deposited on an innermost face of the substrate and is positioned between the substrate and either the first or the second electrode.

20. The electrochromic device of claim 19, wherein the sealant is deposited on both the outermost face and innermost face of the substrate, and the sealant deposited on the innermost face of the substrate is positioned between the transparent substrate and either the first or the second electrode.

21. The electrochromic device of claim 1, including a first bus bar for connecting said first transparent electrode to a first terminal of an external power source; and a second bus bar for connecting said second transparent electrode to a second terminal of an external power source.

22. The electrochromic device of claim 1, wherein the other device comprises a mirror with the electrochromic device deposited thereon.

23. The electrochromic device of claim 22, wherein the mirror is a dimmable mirror configured to selectively remove and/or reduce glare thereon.

24. The electrochromic device of claim 1, comprising the optical filter that is configured to block and/or reflect wavelengths in a predetermined range.

25. The electrochromic device of claim 24, wherein the optical filter is a window.

26. The electrochromic device of claim 24 wherein the optical filter is an optical lens for configured for use within optical eyewear.

27. The electrochromic device of claim 26, wherein the optical lens configured for used within optical eyewear selectively reduces transmittance in the visible range (380 nm-760 nm), near IR ranges (760 nm-1,400 nm), and mid IR range (1,400 nm-3,000 nm) in which transmittance is less than 50% in any combination of the visible, near IR, and mid IR ranges.

28. The electrochromic device of claim 27, wherein transmittance is less than 40% in any combination of the visible, near IR, and mid IR ranges.

29. The electrochromic device of claim 28, wherein transmittance is less than 20% in any combination of the visible, near IR, and mid IR ranges.

30. The electrochromic device of claim 29, wherein transmittance is less than 10% in any combination of the visible, near IR, and mid IR ranges.

31. The electrochromic device of claim 30, wherein transmittance is less than 5% in any combination of the visible, near IR, and mid IR ranges.

32. The electrochromic device of claim 26, wherein the optical lens is included within optical eyewear comprising sunglasses, goggles, reading glasses, prescription glasses or any combination thereof.

33. The electrochromic device of claim 1, wherein the other device comprises the photovoltaic device that is operably coupled to the first transparent electrode of the electrochromic device such that the photovoltaic device is configured to activate the electrochromic device.

* * * * *